US010400946B2

(12) United States Patent
Bennett et al.

(10) Patent No.: US 10,400,946 B2
(45) Date of Patent: Sep. 3, 2019

(54) DISPLAY SUPPORT APPARATUS

(71) Applicant: Southco, Inc., Concordville, PA (US)

(72) Inventors: Nicholas Paul Bennett, Redditch (GB); Stuart Kevan Buckland, Malvern (GB)

(73) Assignee: Southco, Inc., Concordville, PA (US)

( * ) Notice: Subject to any disclaimer, the term of this patent is extended or adjusted under 35 U.S.C. 154(b) by 0 days.

(21) Appl. No.: 14/979,841

(22) Filed: Dec. 28, 2015

(65) Prior Publication Data

US 2016/0109058 A1 Apr. 21, 2016

Related U.S. Application Data

(63) Continuation of application No. 13/179,457, filed on Jul. 8, 2011, now Pat. No. 9,277,812.

(Continued)

(51) Int. Cl.
*F16M 11/12* (2006.01)
*F16M 13/02* (2006.01)

(Continued)

(52) U.S. Cl.
CPC ............ *F16M 13/02* (2013.01); *A47B 81/00* (2013.01); *F16M 11/02* (2013.01); *F16M 11/08* (2013.01); *F16M 11/10* (2013.01); *F16M 11/12* (2013.01); *F16M 11/126* (2013.01); *F16M 11/18* (2013.01); *F16M 11/2014* (2013.01); *F16M 11/2092* (2013.01); *F16M 11/24* (2013.01);

(Continued)

(58) Field of Classification Search
CPC .... F16M 13/02; F16M 11/18; F16M 11/2014; F16M 11/2092; F16M 11/24; F16M 11/42; F16M 11/02; F16M 11/08; F16M 11/10; F16M 11/12; F16M 11/126; F16M 2200/028; F16M 2200/041; F16M 2200/044; F16M 2200/063; F16M 2200/068; G09F 7/18; G09F 21/00
USPC ....................................................... 248/282.1
See application file for complete search history.

(56) References Cited

U.S. PATENT DOCUMENTS 1,220,578 A 3/1917 Wise
1,318,703 A * 10/1919 Stuchlak ................ A47B 23/02 108/139

(Continued)

FOREIGN PATENT DOCUMENTS

CN 101184951 A 5/2008
CN 101427299 5/2009

(Continued)

OTHER PUBLICATIONS

Japanese Office Action for Japanese Application No. 2016/077539, dated Apr. 25, 2017.

(Continued)

*Primary Examiner* — Nkeisha Smith
(74) *Attorney, Agent, or Firm* — RatnerPrestia

(57) ABSTRACT

The display supporting apparatus includes a base, a first arm, a second arm, and a display attachment bracket designed to be fixedly securable or attachable to a display. The display support apparatus further includes a mechanism for providing a constant orientation in relation to the base for the plane bisecting the range of rotation of the second arm about the pivot axis between the first arm and the second arm even as the first arm moves pivotally relative to the base.

29 Claims, 37 Drawing Sheets

Related U.S. Application Data

(60) Provisional application No. 61/362,679, filed on Jul. 8, 2010, provisional application No. 61/362,700, filed on Jul. 9, 2010, provisional application No. 61/363,645, filed on Jul. 12, 2010.

(51) Int. Cl.

| | |
|---|---|
| ***F16M 11/02*** | (2006.01) |
| ***A47B 81/00*** | (2006.01) |
| ***F16M 11/08*** | (2006.01) |
| ***F16M 11/10*** | (2006.01) |
| ***F16M 11/18*** | (2006.01) |
| ***F16M 11/20*** | (2006.01) |
| ***F16M 11/24*** | (2006.01) |
| ***F16M 11/42*** | (2006.01) |
| *G09F 7/18* | (2006.01) |
| *G09F 21/00* | (2006.01) |

(52) U.S. Cl.

CPC ....... *F16M 11/42* (2013.01); *F16M 2200/028* (2013.01); *F16M 2200/041* (2013.01); *F16M 2200/044* (2013.01); *F16M 2200/063* (2013.01); *F16M 2200/068* (2013.01); *G09F 7/18* (2013.01); *G09F 21/00* (2013.01)

(56) References Cited

U.S. PATENT DOCUMENTS

| | | | | | |
|---|---|---|---|---|---|
| 2,033,715 | A | | 3/1936 | Jacob | |
| 2,137,004 | A | | 11/1938 | Langsner | |
| 2,256,241 | A | | 9/1941 | De Lisle | |
| 2,332,967 | A | | 10/1943 | Fatkin | |
| 2,424,840 | A | | 7/1947 | Murphy | |
| 3,240,925 | A | * | 3/1966 | Paschke | F21V 21/14 362/253 |
| 3,279,074 | A | | 10/1966 | McQuaid | |
| 3,401,568 | A | * | 9/1968 | Blatt | F16H 21/365 74/37 |
| 3,952,984 | A | * | 4/1976 | Dimitry | H01Q 1/125 248/282.1 |
| 3,955,241 | A | | 5/1976 | Little | |
| 4,082,244 | A | * | 4/1978 | Groff | A61G 15/16 248/280.11 |
| 4,236,272 | A | | 12/1980 | Gronbach | |
| 4,356,594 | A | | 11/1982 | Grosemans | |
| 4,402,481 | A | * | 9/1983 | Sasaki | F16M 11/12 248/282.1 |
| 4,403,423 | A | | 9/1983 | Ford | |
| 4,548,373 | A | * | 10/1985 | Komura | A61B 6/105 188/171 |
| 4,562,987 | A | * | 1/1986 | Leeds | F16M 11/048 248/278.1 |
| 4,687,167 | A | * | 8/1987 | Skalka | A47B 21/0314 108/103 |
| 4,695,024 | A | * | 9/1987 | Haven | A61B 6/447 248/280.11 |
| 4,783,036 | A | | 11/1988 | Vossoughi | |
| 4,821,159 | A | * | 4/1989 | Pike | F16M 11/2014 248/282.1 |
| 4,861,107 | A | | 8/1989 | Vidwans | |
| 4,897,015 | A | * | 1/1990 | Abbe | B25J 9/106 414/744.8 |
| 4,928,914 | A | | 5/1990 | Snodell | |
| 5,064,340 | A | * | 11/1991 | Genov | B25J 9/042 414/744.5 |
| 5,079,799 | A | | 1/1992 | Rude | |
| 5,127,617 | A | | 7/1992 | Bergetz | |
| 5,201,896 | A | | 4/1993 | Kruszewski | |
| 5,231,734 | A | | 8/1993 | Rude | |
| 5,246,240 | A | | 9/1993 | Romich | |
| 5,251,859 | A | | 10/1993 | Cyrell | |
| 5,257,767 | A | | 11/1993 | McConnell | |
| 5,348,260 | A | * | 9/1994 | Acevedo | F16M 11/18 248/123.11 |
| 5,405,117 | A | | 4/1995 | Davis | |
| 5,487,524 | A | | 1/1996 | Bergetz | |
| 5,491,874 | A | | 2/1996 | Lowry | |
| 5,564,163 | A | | 10/1996 | Lowry | |
| 5,566,048 | A | | 10/1996 | Esterberg | |
| 5,697,125 | A | | 12/1997 | Gannon | |
| 5,697,303 | A | | 12/1997 | Allan | |
| 5,738,316 | A | | 4/1998 | Sweere | |
| 5,743,503 | A | * | 4/1998 | Voeller | F16M 11/08 248/284.1 |
| 5,752,293 | A | | 5/1998 | Lowry | |
| 5,771,539 | A | | 6/1998 | Wahlstedt | |
| 5,771,540 | A | | 6/1998 | Carpenter | |
| 5,787,549 | A | | 8/1998 | Soderlund | |
| 5,790,910 | A | | 8/1998 | Haskin | |
| 5,799,917 | A | | 9/1998 | Li | |
| 5,832,987 | A | | 11/1998 | Lowry | |
| 5,842,672 | A | | 12/1998 | Sweere | |
| 5,860,335 | A | * | 1/1999 | Lund | B25B 17/00 81/57.3 |
| 5,876,008 | A | | 3/1999 | Sweere | |
| 5,878,674 | A | | 3/1999 | Allan | |
| 5,918,841 | A | | 7/1999 | Sweere | |
| 5,924,665 | A | | 7/1999 | Sweere | |
| 5,934,636 | A | | 8/1999 | Cyrell | |
| 5,947,429 | A | | 9/1999 | Sweere | |
| 5,967,479 | A | | 10/1999 | Sweere | |
| 5,975,195 | A | | 11/1999 | Lowry | |
| 5,975,472 | A | | 11/1999 | Hung | |
| 5,992,809 | A | | 11/1999 | Sweere | |
| 6,012,693 | A | * | 1/2000 | Voeller | F16M 11/048 248/279.1 |
| 6,015,120 | A | | 1/2000 | Sweere | |
| 6,019,332 | A | | 2/2000 | Sweere | |
| D423,745 | S | | 4/2000 | Theis | |
| 6,095,468 | A | | 8/2000 | Chirico et al. | |
| 6,102,350 | A | | 8/2000 | Cyrell | |
| 6,141,831 | A | | 11/2000 | Novin | |
| 6,182,330 | B1 | | 2/2001 | Novin | |
| 6,189,849 | B1 | | 2/2001 | Sweere | |
| 6,227,508 | B1 | * | 5/2001 | Panzarella | A47B 21/0314 248/118.3 |
| 6,233,791 | B1 | | 5/2001 | Theis | |
| 6,301,748 | B1 | | 10/2001 | Su-Man | |
| 6,347,433 | B1 | | 2/2002 | Novin | |
| 6,354,549 | B2 | | 3/2002 | Sweere | |
| 6,367,756 | B1 | | 4/2002 | Wang | |
| 6,394,403 | B1 | | 5/2002 | Hung | |
| 6,409,134 | B1 | * | 6/2002 | Oddsen, Jr. | F16M 11/10 248/274.1 |
| 6,419,196 | B1 | | 7/2002 | Sweere | |
| 6,467,129 | B1 | | 10/2002 | Bae | |
| 6,478,274 | B1 | | 11/2002 | Oddsen, Jr. | |
| 6,588,062 | B2 | | 7/2003 | Novin | |
| D478,088 | S | | 8/2003 | Hamouz | |
| 6,609,691 | B2 | | 8/2003 | Oddsen, Jr. | |
| 6,619,606 | B2 | | 9/2003 | Oddsen, Jr. et al. | |
| D488,708 | S | | 4/2004 | Lam | |
| D489,599 | S | | 5/2004 | Lam | |
| 6,732,988 | B2 | | 5/2004 | Ihalainen et al. | |
| 6,736,364 | B2 | | 5/2004 | Oddsen, Jr. | |
| 6,775,884 | B2 | | 8/2004 | Su-Man | |
| 6,791,601 | B1 | | 9/2004 | Chang | |
| D497,537 | S | | 10/2004 | OKeene | |
| 6,871,384 | B2 | | 3/2005 | Novin | |
| 6,883,764 | B1 | | 4/2005 | Mileos | |
| D505,858 | S | | 6/2005 | OKeene | |
| 6,905,101 | B1 | | 6/2005 | Dittmer | |
| 6,915,994 | B2 | | 7/2005 | Oddsen, Jr. | |
| 6,915,995 | B2 | | 7/2005 | Gillespie | |
| 6,973,688 | B2 | | 12/2005 | Barker et al. | |
| 6,997,422 | B2 | | 2/2006 | Sweere | |
| 7,014,157 | B2 | * | 3/2006 | Oddsen | F16M 11/10 188/322.22 |
| 7,028,961 | B1 | | 4/2006 | Dittmer et al. | |
| 7,032,870 | B2 | | 4/2006 | Sweere | |

(56) References Cited

U.S. PATENT DOCUMENTS 7,048,242 B2 * 5/2006 Oddsen, Jr. ............ F16M 11/10 248/279.1
7,055,215 B1 6/2006 Ligtenberg
7,065,834 B2 6/2006 Lowry
7,079,874 B2 7/2006 Pontoppidan
7,099,148 B2 8/2006 Lee
D530,595 S 10/2006 Lam
7,152,836 B2 12/2006 Pfister
D537,323 S 2/2007 Saez
7,175,152 B2 2/2007 Dittmer
7,177,144 B2 2/2007 Ha et al.
7,178,775 B2 2/2007 Pfister
D537,706 S 3/2007 LyHau
D538,140 S 3/2007 LyHau
D538,141 S 3/2007 Stenhouse
D538,632 S 3/2007 LyHau
D538,633 S 3/2007 LyHau
D539,123 S 3/2007 LyHau
D539,125 S 3/2007 LyHau
D539,126 S 3/2007 Stenhouse
D539,127 S 3/2007 LyHau
D539,128 S 3/2007 LyHau
D539,566 S 4/2007 Anderson
D539,636 S 4/2007 Bremmon
D539,637 S 4/2007 LyHau
D540,154 S 4/2007 Bremmon
D540,332 S 4/2007 Dittmer
7,207,537 B2 * 4/2007 Hung ..................... F16M 11/10 248/274.1
D543,210 S 5/2007 Stenhouse
D543,547 S 5/2007 Muday
D543,548 S 5/2007 Muday
7,243,892 B2 7/2007 Pfister
7,246,780 B2 7/2007 Oddsen, Jr.
7,252,277 B2 8/2007 Sweere et al.
7,303,173 B2 12/2007 Mileos
7,334,765 B2 2/2008 Hwang
7,338,022 B2 * 3/2008 Hung .................. F16M 11/041 248/278.1
7,345,870 B2 3/2008 Shin
7,364,127 B2 * 4/2008 Huang .................. F16M 11/10 248/276.1
7,380,760 B2 6/2008 Dittmer
7,387,286 B2 6/2008 Dittmer et al.
7,389,965 B2 * 6/2008 Oddsen, Jr. ............ F16M 11/10 248/274.1
7,395,995 B2 * 7/2008 Chen .................... F16M 11/105 248/284.1
7,395,996 B2 7/2008 Dittmer
7,398,950 B2 7/2008 Hung
7,458,549 B2 12/2008 Oddsen, Jr.
7,472,458 B2 1/2009 Oddsen, Jr.
7,487,943 B1 2/2009 Gillespie
7,497,408 B2 3/2009 Lim et al.
7,506,853 B2 3/2009 Sweere
7,513,474 B2 4/2009 Anderson et al.
7,530,123 B2 5/2009 Cao
7,540,457 B2 6/2009 Oddsen, Jr. et al.
7,546,994 B2 6/2009 Altonji et al.
7,567,436 B2 7/2009 Jeong
7,571,883 B2 8/2009 Van Groesen et al.
7,593,218 B2 9/2009 Hwang et al.
7,604,210 B2 10/2009 Oddsen, Jr. et al.
7,663,699 B2 2/2010 Sakata et al.
7,673,839 B2 3/2010 Zhang et al.
7,679,892 B2 3/2010 Jung
7,690,605 B2 4/2010 Lee
7,690,611 B2 4/2010 Asamarai
7,694,927 B2 * 4/2010 Chuang ................ F16M 11/041 248/276.1
7,717,383 B2 5/2010 Russell
7,748,666 B2 7/2010 Oddsen, Jr. et al.
7,766,288 B2 8/2010 Kim et al.
7,775,485 B2 8/2010 Asai et al.
7,793,903 B2 9/2010 Dittmer et al.
7,806,378 B2 10/2010 Oddsen, Jr.
7,810,773 B2 * 10/2010 Chi .................... F16M 11/2064 248/121
7,815,154 B2 10/2010 Oh et al.
7,823,849 B2 11/2010 Dittmer et al.
7,832,700 B2 11/2010 Ciungan
7,841,569 B2 11/2010 Mileos
7,841,570 B2 11/2010 Mileos
D631,445 S 1/2011 Dittmer
7,861,998 B2 * 1/2011 Huang ................ F16M 11/105 248/125.1
7,866,622 B2 1/2011 Dittmer
7,887,014 B2 2/2011 Lindblad
7,922,137 B2 4/2011 Derry et al.
7,954,780 B2 6/2011 Dittmer
7,975,976 B2 7/2011 Wohlford
7,992,832 B2 8/2011 Zhang et al.
D644,648 S 9/2011 Anderson
8,056,874 B2 * 11/2011 Goodwin ................. A61G 5/10 248/276.1
8,070,114 B2 * 12/2011 Chen ...................... F16M 11/14 248/121
8,070,120 B2 * 12/2011 Lange ................ F16M 11/2014 248/282.1
8,074,949 B2 * 12/2011 Oddsen, Jr. ............ F16M 11/10 248/276.1
8,094,438 B2 1/2012 Dittmer et al.
D655,297 S 3/2012 Magnusson
D660,845 S 5/2012 Schmauch
8,191,487 B2 * 6/2012 Theesfeld .............. A47B 57/06 108/106
8,228,668 B2 7/2012 Asamarai
8,254,092 B2 8/2012 Russell et al.
8,256,729 B2 9/2012 Koch
8,310,468 B2 11/2012 Martin
8,328,151 B2 * 12/2012 Gwag .................... F16M 11/10 248/284.1
8,336,840 B2 12/2012 Song et al.
8,359,982 B2 * 1/2013 Lebel ....................... A47B 3/00 108/44
8,366,060 B2 * 2/2013 Hung ................... F16M 11/041 248/124.1
8,469,323 B1 * 6/2013 Deros .................. F16M 11/105 248/123.11
8,490,934 B2 7/2013 Dittmer
8,508,918 B2 8/2013 Dittmer et al.
8,525,939 B2 9/2013 Perez Perez et al.
8,561,955 B2 10/2013 Stemple
8,693,172 B2 4/2014 Russell et al.
8,720,838 B2 5/2014 Bowman et al.
8,733,722 B2 5/2014 Hung
8,837,127 B2 9/2014 Dittmer et al.
8,870,140 B2 10/2014 Stemple
8,888,062 B2 11/2014 Novin
8,931,748 B2 * 1/2015 Bowman ................ F16M 11/10 248/280.11
9,022,339 B2 * 5/2015 Borg .................... H02G 3/0493 248/323
9,062,816 B2 6/2015 Kulkarni et al.
9,103,489 B2 8/2015 Gwag
9,121,543 B2 9/2015 Dittmer et al.
9,228,696 B2 1/2016 Borloz et al.
9,243,743 B2 1/2016 Hunter et al.
9,266,243 B2 2/2016 Swartz et al.
9,279,536 B2 3/2016 Dittmer et al.
9,298,254 B2 3/2016 Ha et al.
9,355,219 B2 * 5/2016 Paydar ................ G06F 19/3462
9,357,846 B2 6/2016 Hung
9,427,364 B2 * 8/2016 Grant ..................... A61G 5/125
2001/0023914 A1 9/2001 Oddsen, Jr.
2003/0132356 A1 7/2003 Copeland
2004/0084587 A1 * 5/2004 Oddsen .................. F16M 11/10 248/284.1
2004/0256526 A1 12/2004 Burns
2004/0262475 A1 12/2004 Oddsen, Jr.
2005/0284997 A1 * 12/2005 Tisbo ..................... F16M 11/08 248/276.1

(56) References Cited

U.S. PATENT DOCUMENTS

| | | | | |
|---|---|---|---|---|
| 2006/0032998 | A1 | 2/2006 | Depay | |
| 2006/0065795 | A1 | 3/2006 | Blackburn | |
| 2006/0261228 | A1 | 11/2006 | Hung | |
| 2006/0266909 | A1 | 11/2006 | Oddsen, Jr. et al. | |
| 2006/0273231 | A1* | 12/2006 | Huang | F16M 11/10 248/371 |
| 2007/0001076 | A1 | 1/2007 | Asamarai et al. | |
| 2007/0023598 | A1 | 2/2007 | Kim | |
| 2007/0053151 | A1* | 3/2007 | Capoferri | F16M 11/10 361/679.21 |
| 2007/0080266 | A1 | 4/2007 | Oddsen, Jr. | |
| 2007/0114342 | A1 | 5/2007 | Lee | |
| 2007/0153459 | A1 | 7/2007 | Wohlford et al. | |
| 2007/0170321 | A1 | 7/2007 | Smed | |
| 2007/0187562 | A1* | 8/2007 | Gaida | F16M 11/10 248/280.11 |
| 2007/0222776 | A1 | 9/2007 | Choi et al. | |
| 2007/0252056 | A1 | 11/2007 | Novin | |
| 2007/0258200 | A1 | 11/2007 | Choi et al. | |
| 2007/0278361 | A1 | 12/2007 | May | |
| 2008/0001048 | A1 | 1/2008 | Woo et al. | |
| 2008/0001866 | A1 | 1/2008 | Martin | |
| 2008/0006748 | A1 | 1/2008 | Watanabe et al. | |
| 2008/0006751 | A1 | 1/2008 | Chen | |
| 2008/0016650 | A1 | 1/2008 | Moon | |
| 2008/0019393 | A1 | 1/2008 | Yamaki | |
| 2008/0029661 | A1 | 2/2008 | Chen | |
| 2008/0029670 | A1* | 2/2008 | Hung | F16M 11/041 248/278.1 |
| 2008/0078906 | A1 | 4/2008 | Hung | |
| 2008/0100996 | A1 | 5/2008 | Wang | |
| 2008/0105807 | A1 | 5/2008 | Oh | |
| 2008/0117578 | A1 | 5/2008 | Moscovitch | |
| 2008/0132786 | A1* | 6/2008 | Asai | A61B 8/14 600/437 |
| 2008/0135707 | A1 | 6/2008 | Derry et al. | |
| 2008/0164395 | A1 | 7/2008 | Chang | |
| 2008/0192418 | A1* | 8/2008 | Zambelli | F16M 11/041 361/679.02 |
| 2008/0234577 | A1 | 9/2008 | Murkowski | |
| 2008/0237439 | A1 | 10/2008 | Oddsen | |
| 2008/0283691 | A1 | 11/2008 | Bliven | |
| 2008/0296452 | A1 | 12/2008 | Kim | |
| 2008/0308699 | A1 | 12/2008 | Kim et al. | |
| 2009/0057514 | A1 | 3/2009 | Oh | |
| 2009/0072108 | A1 | 3/2009 | Oleson | |
| 2009/0078841 | A1 | 3/2009 | Oddsen, Jr. et al. | |
| 2009/0236484 | A1 | 9/2009 | Koch | |
| 2010/0006727 | A1 | 1/2010 | Boomgaarden | |
| 2010/0172072 | A1 | 7/2010 | Monaco | |
| 2010/0239073 | A1 | 9/2010 | Eaves | |
| 2010/0258694 | A1 | 10/2010 | Steger | |
| 2011/0006175 | A1* | 1/2011 | Gwag | F16M 11/10 248/201 |
| 2011/0019344 | A1 | 1/2011 | Russell | |
| 2011/0108698 | A1* | 5/2011 | Chen | E05B 73/0082 248/553 |
| 2011/0147546 | A1* | 6/2011 | Monsalve | F16M 11/041 248/122.1 |
| 2011/0260017 | A1 | 10/2011 | Monsalve et al. | |
| 2011/0278424 | A1 | 11/2011 | Theis | |
| 2011/0315843 | A1* | 12/2011 | Hung | F16M 11/041 248/279.1 |
| 2012/0025037 | A1* | 2/2012 | Chang | F16M 11/2014 248/124.1 |
| 2012/0182709 | A1 | 7/2012 | Asai | |
| 2013/0119219 | A1* | 5/2013 | Mifsud | F16M 13/022 248/276.1 |
| 2013/0314890 | A1 | 11/2013 | Smith | |
| 2014/0138506 | A1 | 5/2014 | Dahl et al. | |
| 2015/0245708 | A1 | 9/2015 | Abernethy et al. | |
| 2015/0250315 | A1 | 9/2015 | Gross et al. | |
| 2015/0308610 | A1 | 10/2015 | Zhao et al. | |
| 2016/0116109 | A1 | 4/2016 | Borloz et al. | |

FOREIGN PATENT DOCUMENTS

| | | | |
|---|---|---|---|
| DE | 4442642 | | 6/1996 |
| EP | 1586803 | | 10/2005 |
| JP | 63280292 | A | 11/1988 |
| JP | 0468978 | A | 3/1992 |
| JP | 10126068 | A | 5/1998 |
| JP | 2000095034 | A | 4/2000 |
| JP | 3071020 | U | 6/2000 |
| JP | 2000179538 | A | 6/2000 |
| JP | 2001020939 | A | 1/2001 |
| JP | 2001142407 | A | 5/2001 |
| JP | 2001218133 | | 8/2001 |
| JP | 2002300496 | | 10/2002 |
| JP | 2004019916 | A | 1/2004 |
| JP | 2004363788 | | 12/2004 |
| JP | 2005264970 | | 9/2005 |
| JP | 2007520304 | A | 7/2007 |
| JP | 2008014472 | A | 1/2008 |
| JP | 2008142331 | A | 6/2008 |
| JP | 2009543131 | A | 12/2009 |
| JP | 2010078739 | A | 4/2010 |
| KR | 1020050058738 | | 6/2005 |
| WO | 2005074806 | A1 | 8/2005 |

OTHER PUBLICATIONS

Chinese Office Action for Application No. 2016100925586, dated Jun. 1, 2017, 5 pages.

Chinese Second Office Action for Chinese Application No. 201610092558.6, dated Feb. 2, 2018, including English translation, 7 pages.

Notice of Reasons for Rejection for Japanese Application No. 2016-077539, dated Feb. 6, 2018 with translation, 8 pages.

Japanese Decision of Rejection for Japanese Application No. 2016-077539, dated Dec. 11, 2018, with translation, 2 pages.

Japanese Decision of Declining of Amendment for Japanese Application No. 2016-077539, dated Dec. 11, 2018, with translation, 5 pages.

Chinese Office Action for Application No. 201610092558.6, dated Sep. 5, 2018 with translation, 20 pages.

Japanese Notice of Reasons for Rejection for Japanese Application No. 2017-206164, dated Sep. 18, 2018—6 pages.

Chinese Office Action for Chinese Application No. 201610092558.6, dated Apr. 2, 2019, with translation, 18 pages.

Drawings of the AV Series Dynamic Mounting Arm made by Southco, Inc., Oct. 7, 2009.

First Chinese Office Action dated Jul. 14, 2015 in Chinese Application No. 201180033819.2 (with English translation).

Illustration of the Ergotron 200 Series Monitor Arm, obtained from the Ergotron website, Jun. 29, 2010.

Illustration of the HumanScale Monitor Arm (M4V), obtained from the HumanScale website, Jun. 29, 2010.

Illustrations of drafting tables with parallel mechanisms, Wikipedia, Jun. 29, 2010.

Illustrations of the GCX-VHM monitor support arm with 16 in./40.6cm extension for flat panel displays, obtained from the GCX website, Jun. 29, 2010.

Illustrations of the Hergo Wall Mount Secured Angle (15-000036-L12) monitor support arm, obtained from the Hergo website, Jun. 29, 2010.

International Preliminary Report on Patentability for International Application No. PCT/US2011/043458 dated Jan. 8, 2013.

International Search Report for International Application No. PCT/US2011/043458 dated Feb. 9, 2012.

IPF-2 Monitor Arm—Specification, Olympus, Sep. 2009.

Omnimount product brochure, part #63HDARM-UA, part # 54DARMUA, part # 63HDARM, part # 63HDARMUA, 3 pages, 2005 (obtained from www.omnimount.com on or prior to Mar. 13, 2006).

Peerless product brochure, models PLA 2 and PLA 2S, 2 pages, 2003 (obtained from www.peerlessindustries.coom on or prior to Mar. 13, 2006).

(56) References Cited

OTHER PUBLICATIONS

Sanus Systems product assembly instructions, Vision Mount VMAA Flat Panel Wall Mount, 8 pages, obtained from www.sanus.com on or prior to Mar. 13, 2006.
Sanus Systems product assembly instructions, Vision Mount VMDD 26 Flat Panel Wall Mount, 8 pages, obtained from www.sanus.com on or prior to Mar. 13, 2006.
Entire patent prosecution history of U.S. Appl. No. 13/179,457, filed Jul. 8, 2011, entitled Display Support With First and Second Arms and Mechanism for Maintaining Constant Orientation of the Plane Bisecting the Range of Rotation of the Second Arm Relative to a Support Base.

* cited by examiner

Section A-A

Section D–D

Section B–B

Section C–C

Section A–A

Section C–C

Section A–A

Section B–B

DISPLAY SUPPORT APPARATUS

CROSS REFERENCE TO RELATED APPLICATIONS

This application claims the benefit of priority of U.S. Non-provisional application Ser. No. 13/179,457 filed on Jul. 8, 2011, which claimed the priority of U.S. Provisional Application for Patent Ser. No. 61/362,679, filed on Jul. 8, 2010, U.S. Provisional application for Patent Ser. No. 61/362,700, filed on Jul. 9, 2010, and U.S. Provisional application for Patent Ser. No. 61/363,645, filed on Jul. 12, 2010, which are all incorporated by reference herein in their entirety.

BACKGROUND OF THE INVENTION

1. Field of the Invention

The present invention is directed to a display supporting apparatus for supporting a display, for example, a flat screen monitor or the like, in a desired position for easy viewing by a user.

2. Discussion of the Prior Art

Many display supporting apparatuses for supporting flat screen or flat panel displays in a user selected position are known in the prior art. However, most of the prior art display supporting apparatuses have a base that is designed to be secured to a wall or some other fixed or stationary structure. None of the prior art display supporting apparatuses are seen to offer the advantages of the present invention that will become apparent from the detailed description of the invention provided below and the appended drawings.

SUMMARY OF THE INVENTION

The present invention is directed to a display supporting apparatus for supporting displays including but not limited to displays such as flat screen computer monitors or the like in a user selected position. The display supporting apparatus includes a base, a first arm, a second arm, and a display attachment bracket designed to be fixedly securable or attachable to the display while preferably being detachable or removable from the display using appropriate fasteners. In use the display attachment bracket moves with the display as a unit. The base is designed for fixed attachment to some support structure. Preferably, the base is designed such that the fixed attachment of the base to the support structure can be undone or reversed in order to allow for the adjustment of the position of the base relative to the support structure or to allow the removal of the base from the support structure or both. The first end of the first arm is pivotally attached to the base by a first pivot mechanism to provide for the pivotal attachment of the first arm to the base. The first end of the second arm is pivotally attached to the second end of the first arm by a second pivot mechanism to provide for the pivotal attachment of the second arm to the first arm. The first pivot mechanism includes pivot stops that limit the range of the pivotal movement of the first arm relative to the base. The display support apparatus further includes a mechanism for providing a constant orientation in relation to the base for the plane bisecting the range of rotation of the second arm about the pivot axis between the first arm and the second arm even as the first arm moves pivotally relative to the base.

Preferably, the second arm is of a four link configuration that allows the up-and-down movement of the display attachment bracket without affecting the orientation of the display attachment bracket relative to the base. The second arm also includes a telescoping gas strut to counter balance the weight of the display so as to maintain the vertical position of the monitor as selected by the user. In addition, the gas strut dampens the up-and-down movement of the monitor to give the user better control when moving the display vertically. The second end of the second arm is attached to the display attachment bracket by a two-axis pivot joint that allows the pivotal movement of the display attachment bracket about a vertical pivot axis and a horizontal pivot axis relative to the second end of the second arm. The vertical pivot axis and the horizontal pivot axis are oriented relative to the display attachment bracket such that they are both perpendicular to a direction vector that is normal, i.e. perpendicular, to the surface of the display screen when the display is attached to the display attachment bracket. A notch is provided in the second end of the second arm that receives a fin provided on the first end of the first arm when the second arm is lowered to rest in superimposed fashion on top of the first arm. This feature prevents the second arm from being moved pivotally in a horizontal plain from rest relative to the first arm without the second arm first being slightly raised to a predetermined height above the first arm. This feature prevents accidental movement of the display when a mobile cart, to which the display support apparatus is attached, is maneuvered.

The display support apparatus of the present invention is particularly well suited for supporting a display on a mobile or movable support structure such as an equipment cart. Equipment carts are typically used to support medical equipment, such as ultrasound or endoscopy equipment, that require a display for use by the user or operator. The display support apparatus of the present invention is designed to securely hold the display in place when the cart is being moved so that the display does not accidentally impact other objects or persons, which lessens the risk of damage or injury. Also, the display support apparatus of the present invention, by limiting the range of rotation of the first arm and by providing a constant orientation for the plane bisecting the range of rotation of the second arm about the pivot axis between the first arm and the second arm, limits the distance outside the footprint of the cart to which the center of mass of the display can be moved to thereby significantly reduce the probability that the equipment cart will tip over due to the destabilizing torque arising from the weight of the display.

It is an object of the present invention to provide a display support apparatus that supports a display at a user selected location and position relative to a support structure.

It is an object of the present invention to provide a display support apparatus that securely holds the display in place when the support structure is being moved.

It is an object of the present invention to provide a display support apparatus that limits the distance outside the footprint of the support structure to which the center of mass of the display can be moved in order to significantly reduce the probability that the support structure will tip over.

It is an object of the present invention to provide a display support apparatus having a base, a first arm and a second arm, rotation stops that limit the range of rotation of the first arm relative to the base, and a mechanism for providing a constant orientation relative to the base for the plane bisecting the range of rotation of the second arm about the pivot axis between the first arm and the second arm.

It is an object of the present invention to provide a display support apparatus having a base, a first arm and a second arm, a display attachment bracket, and a mechanism for providing a constant orientation relative to the base for the display attachment bracket even as the display is raised or lowered vertically due to the rotation of the longitudinal axis of the second arm in a vertical plane.

These and other objects of the invention will become readily apparent from a study of the attached detailed description of the invention and drawing figures.

Figure 1:
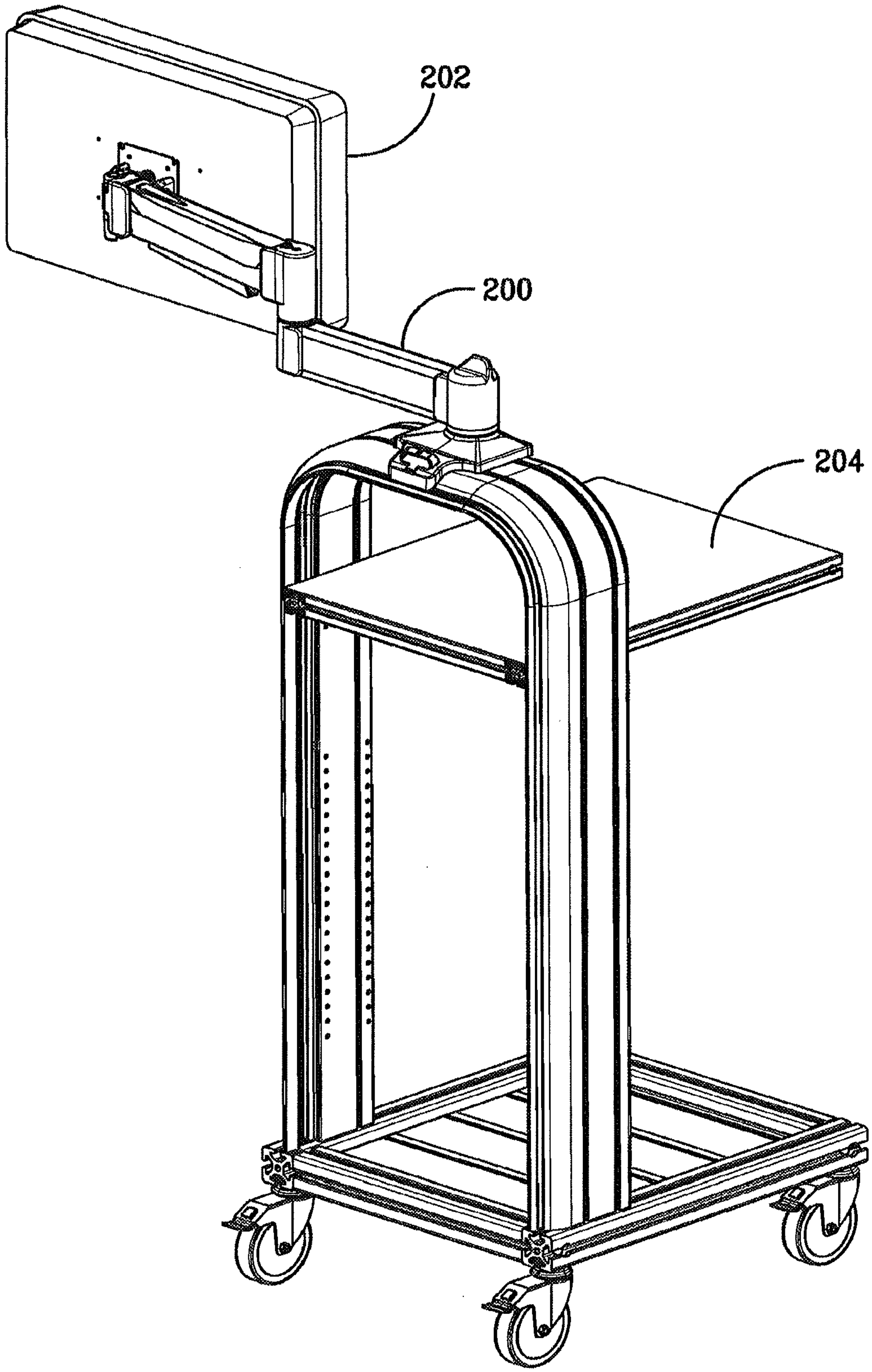
FIGS. 1-3 are environmental views of a display supporting apparatus according to the present invention.

The same reference numerals are used consistently throughout the attached drawings. Where different reference numerals are used to refer to different parts that are structurally identical and a single set of close-up views illustrates the details of the structurally identical parts, reference numerals separated by a comma are used in the drawings to indicate that the illustration represents two different but structurally identical parts that have the same visual depiction.

DETAILED DESCRIPTION OF THE PREFERRED EMBODIMENTS

Figure 2:
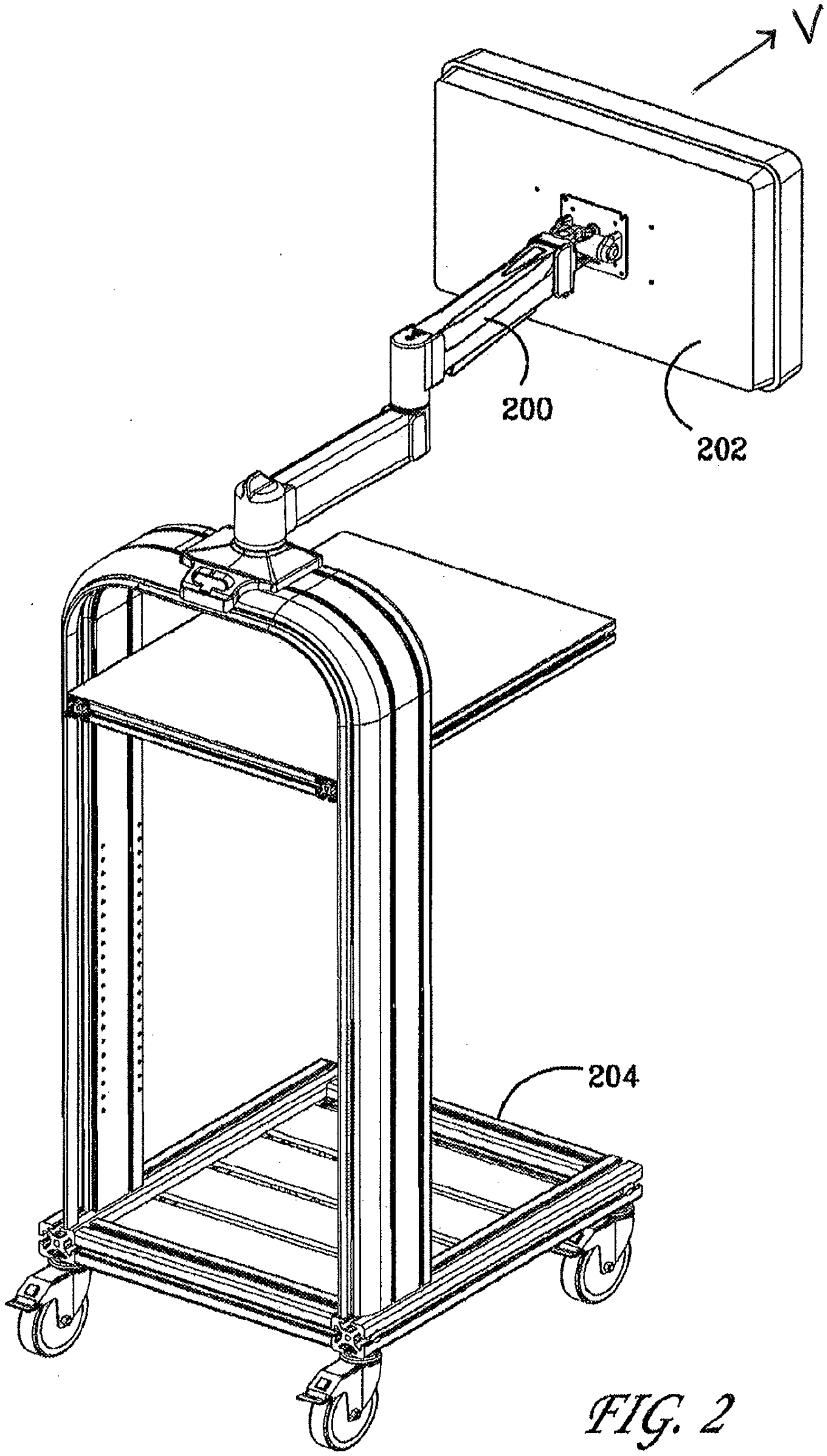
Figure 3:
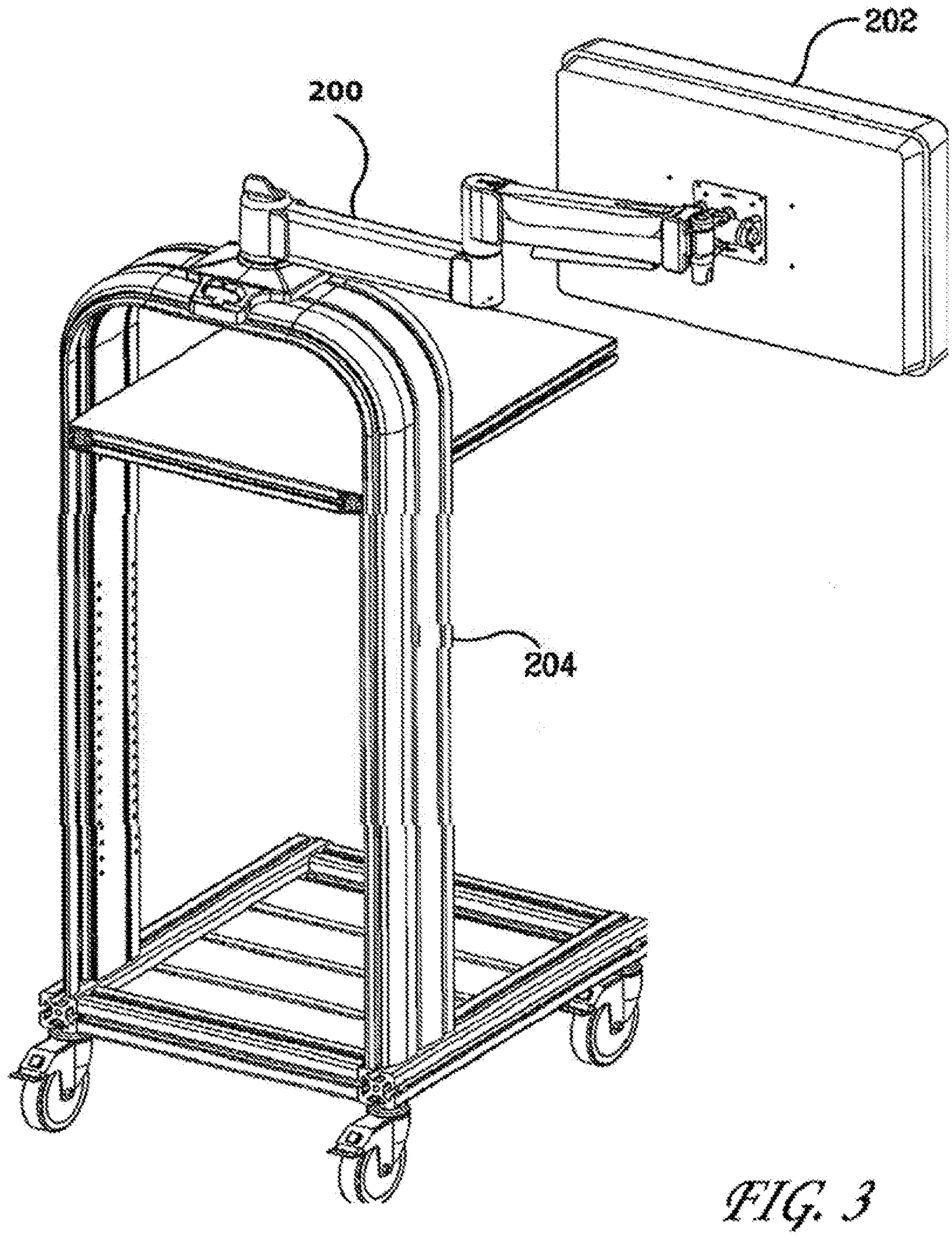
Figure 4:
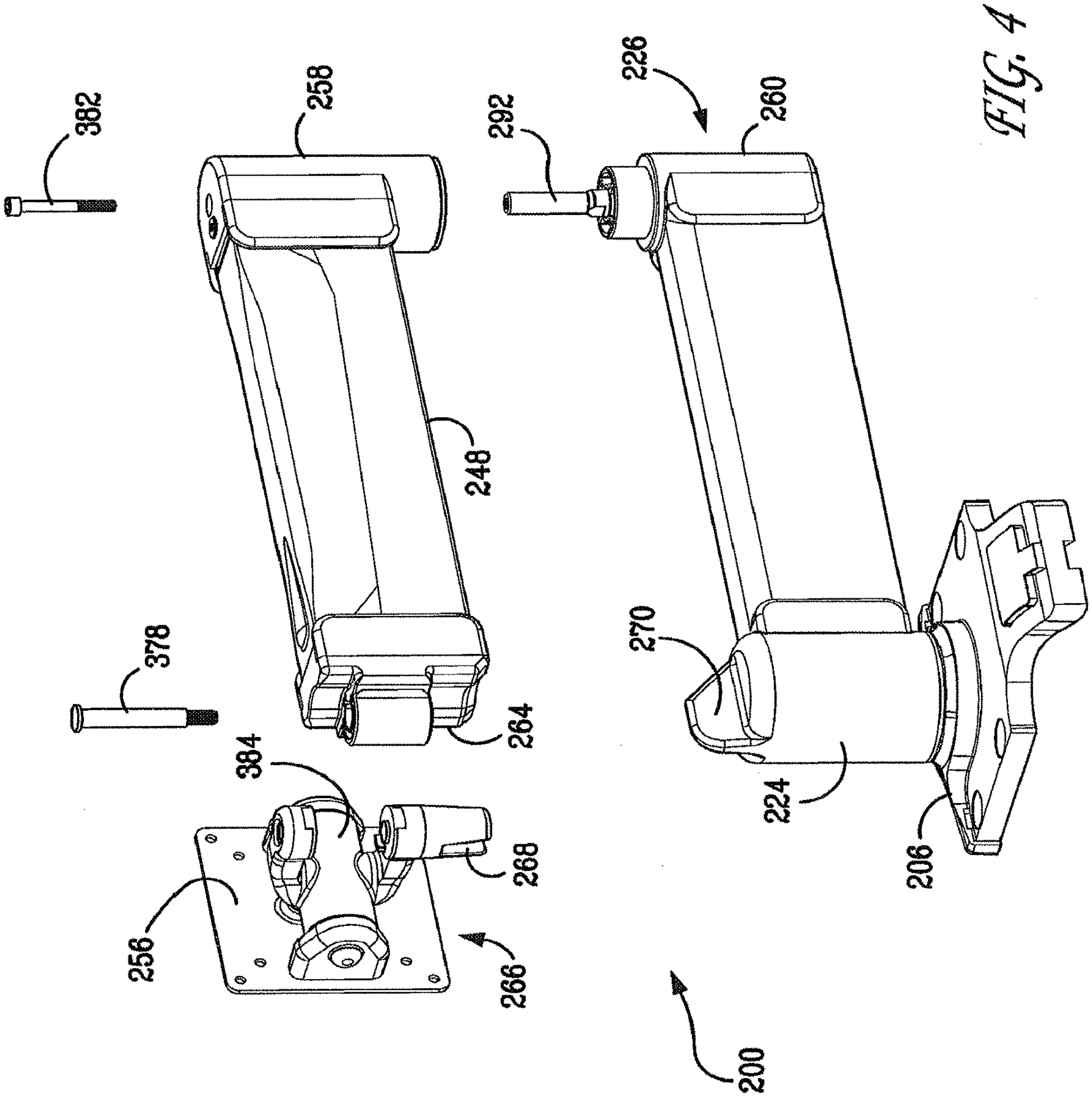
FIG. 4 is an overall exploded view of the display supporting apparatus according to the present invention.
Figure 5:
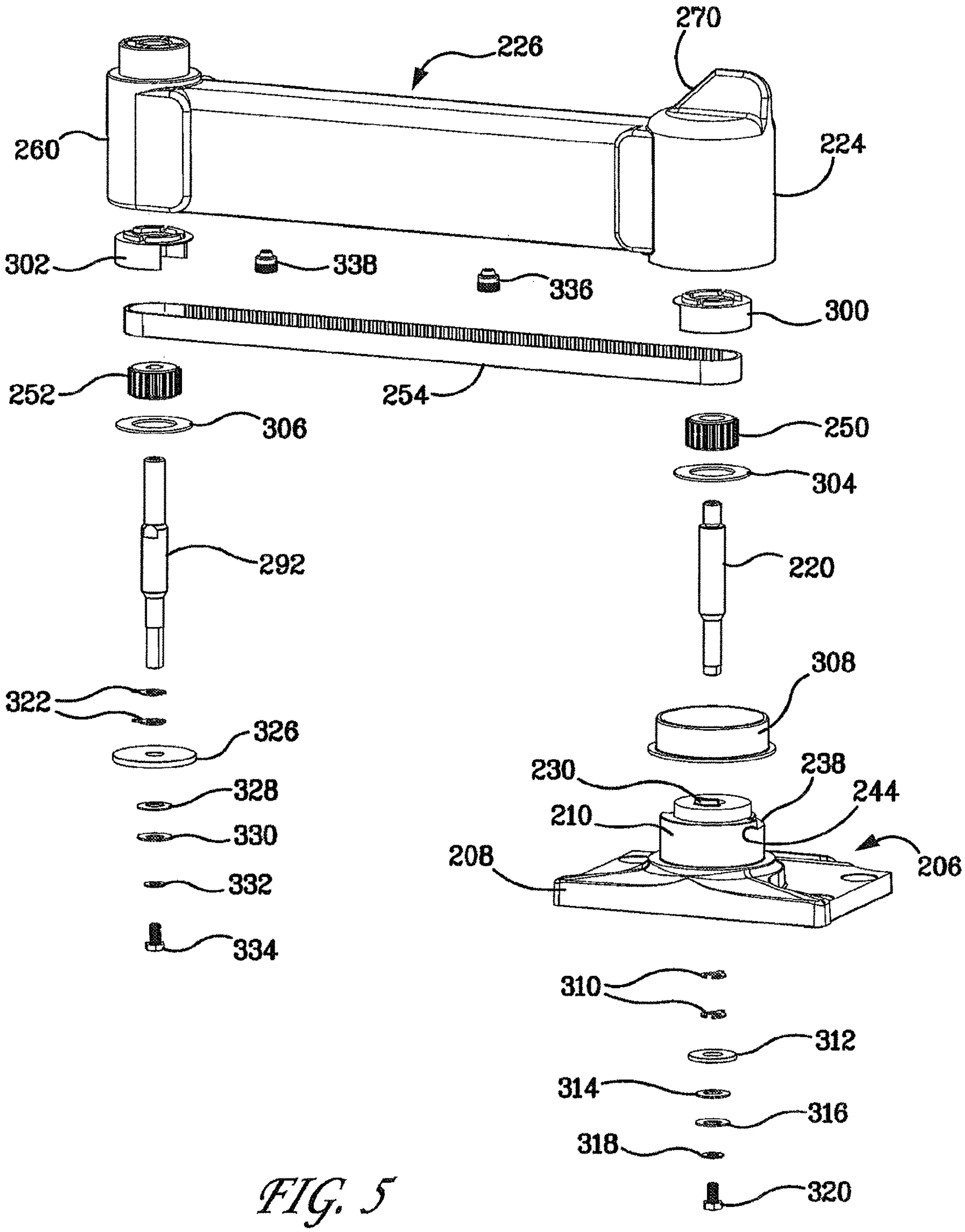
FIG. 5 is an exploded view of the first arm of the display supporting apparatus according to the present invention.
Figure 6:
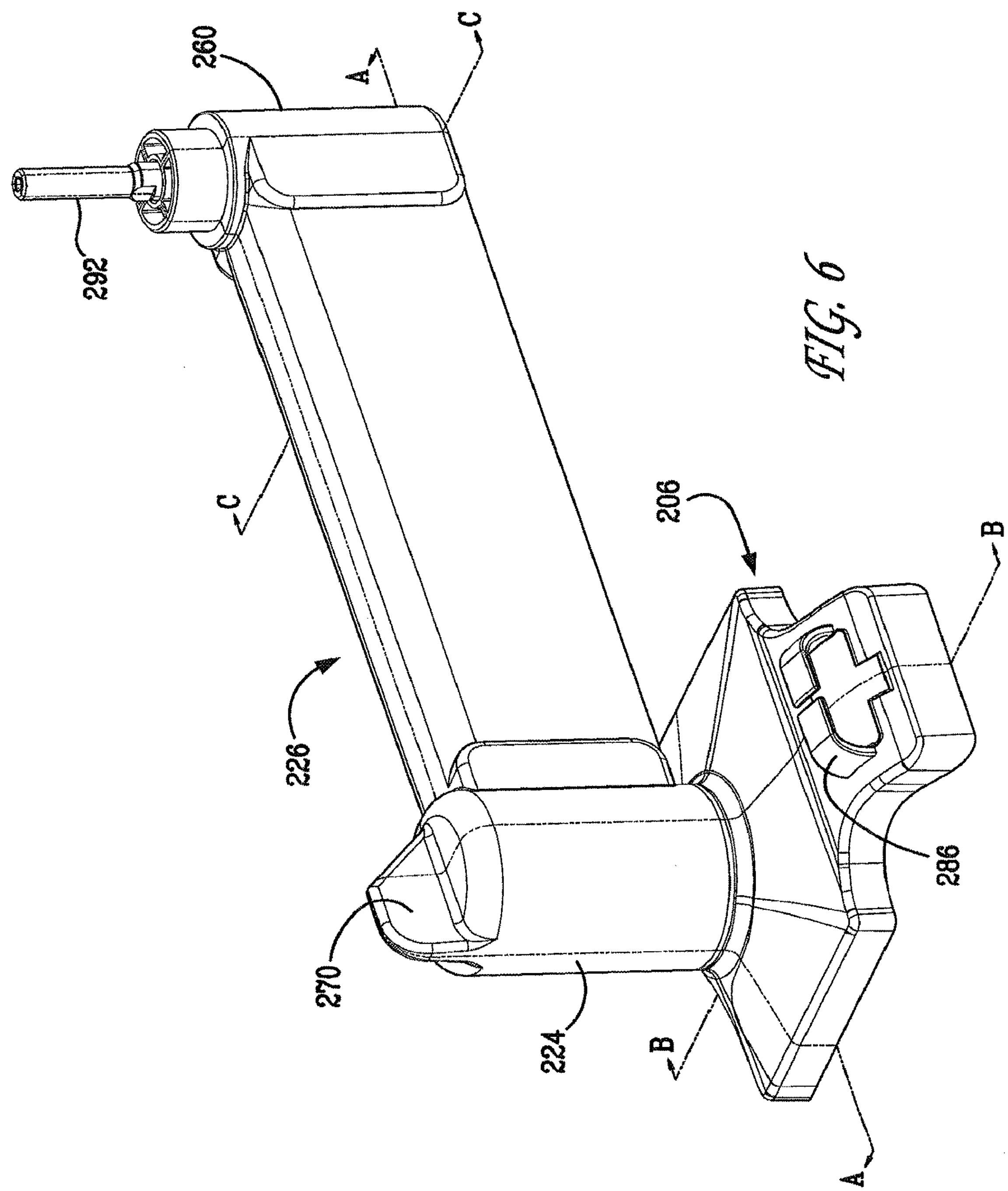
FIG. 6 is a perspective view of the first arm of the display supporting apparatus according to the present invention.
Figure 7:
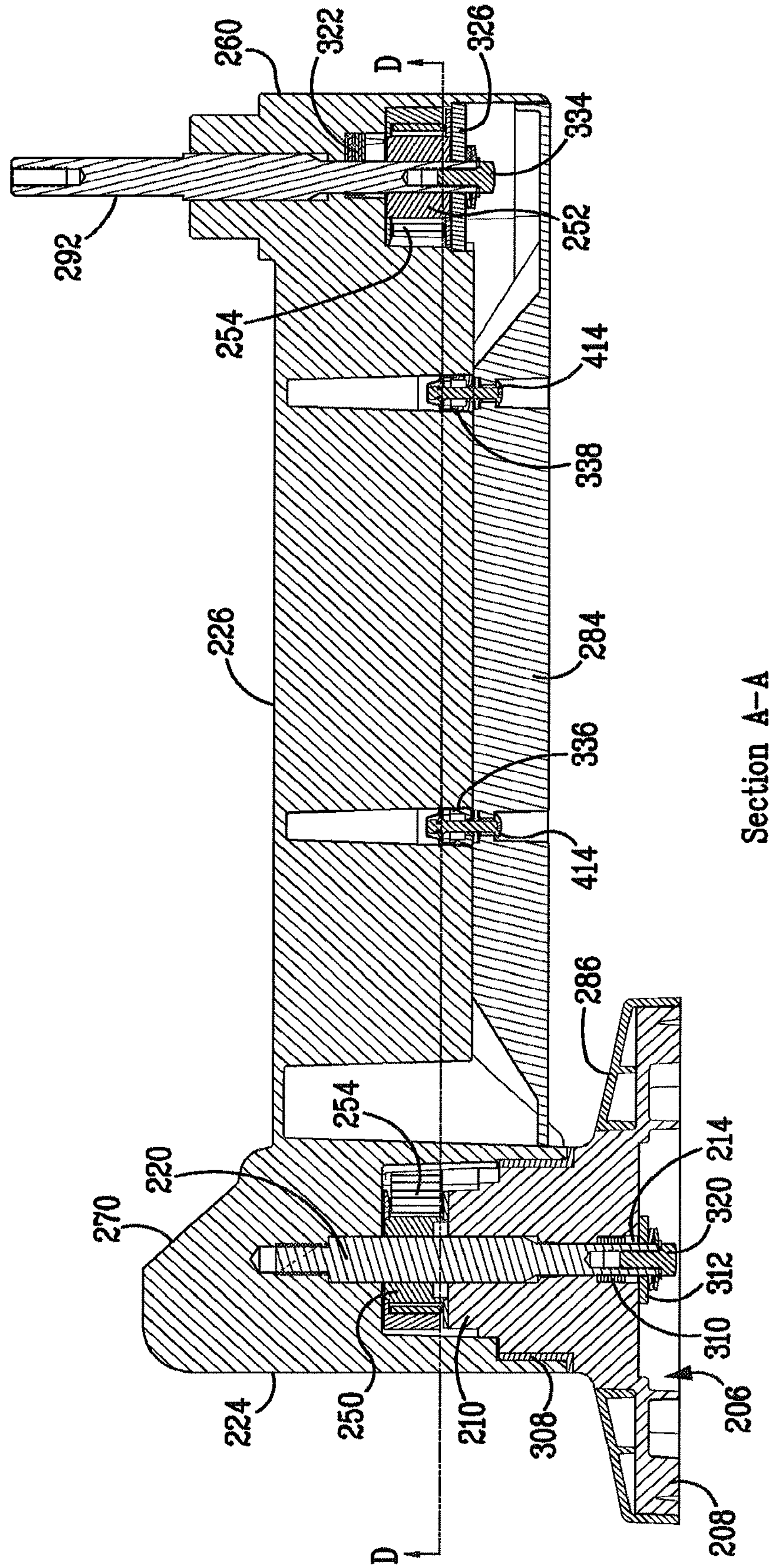
FIGS. 7-10 are cross sectional views of the first arm of the display supporting apparatus according to the present invention.
Figure 8:
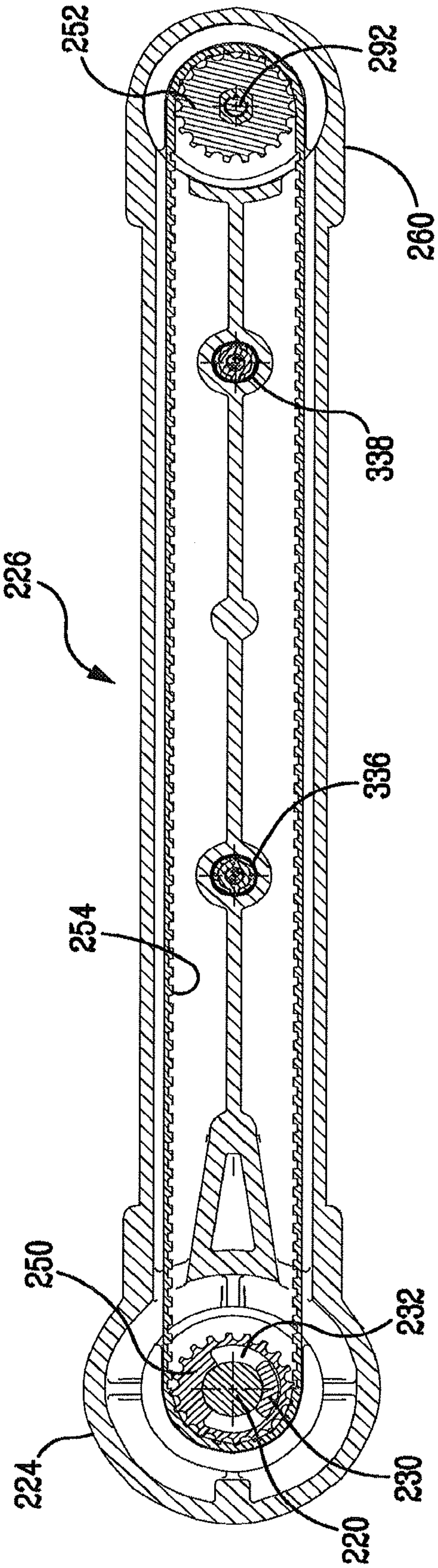
Figure 9:
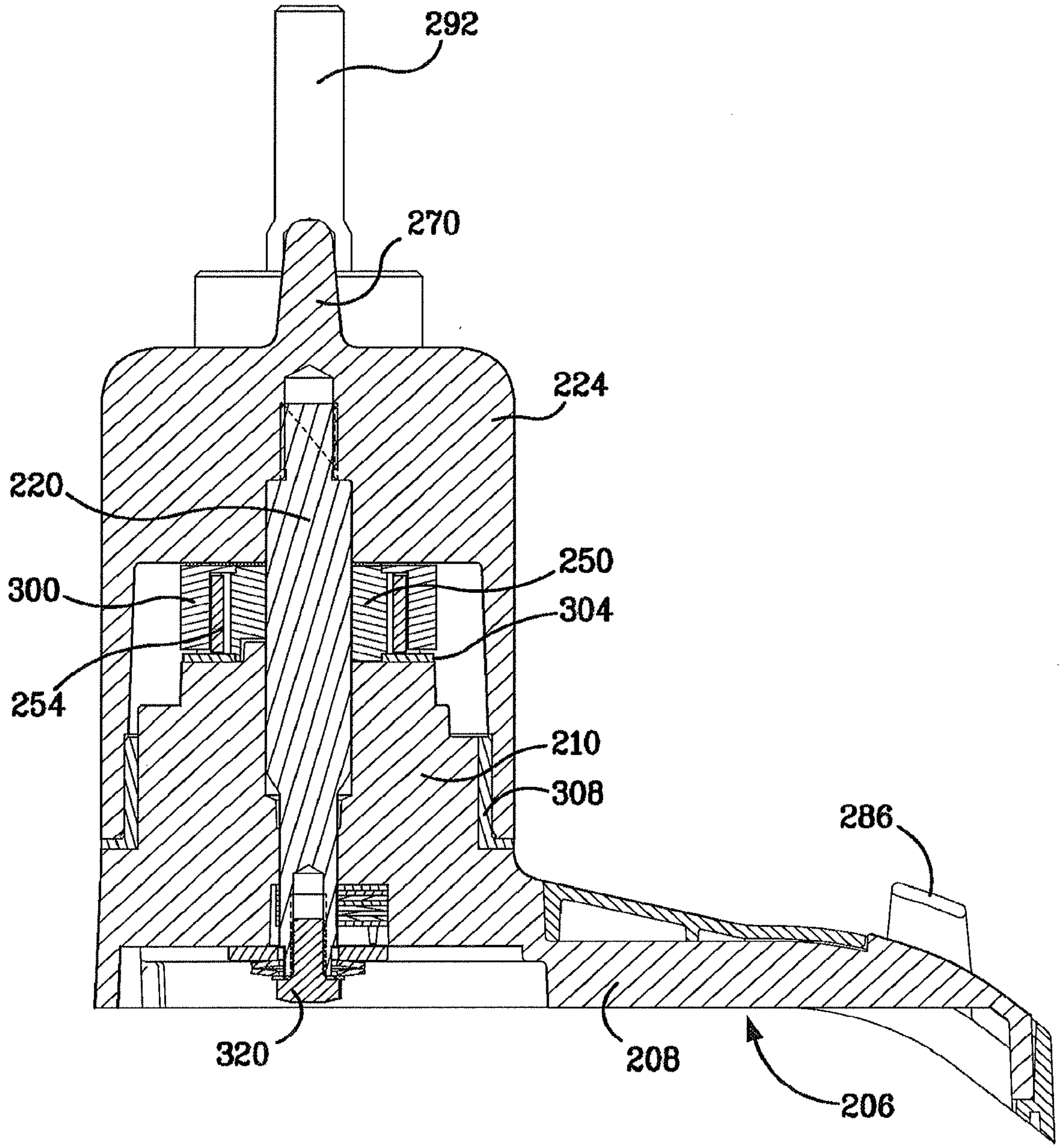
Figure 10:
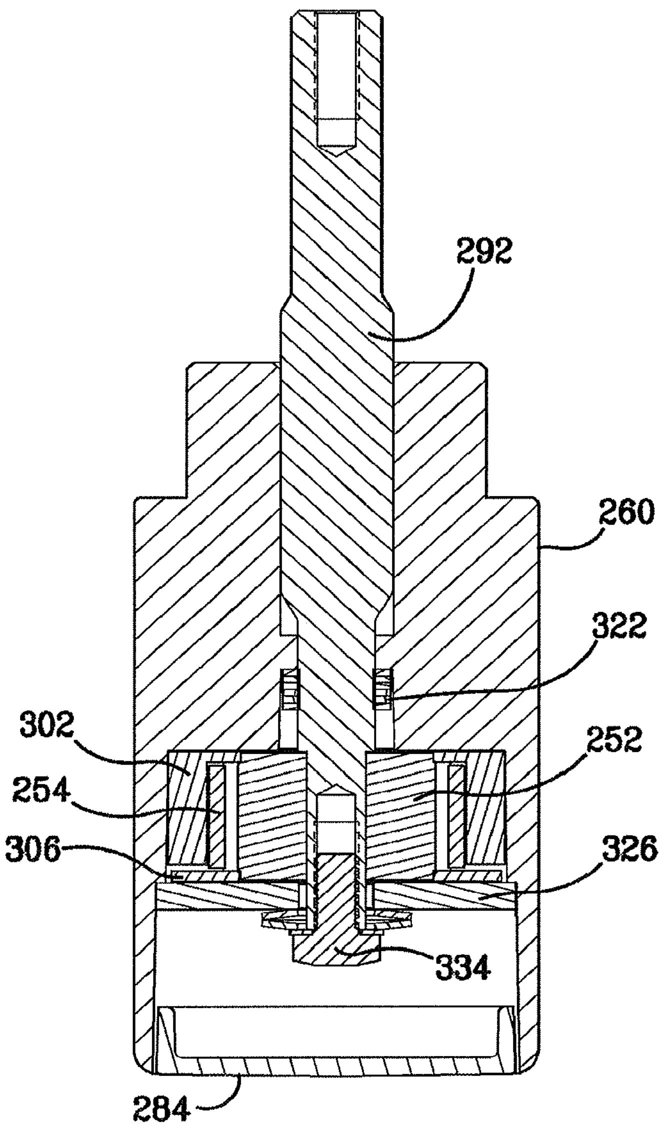
Figure 11:
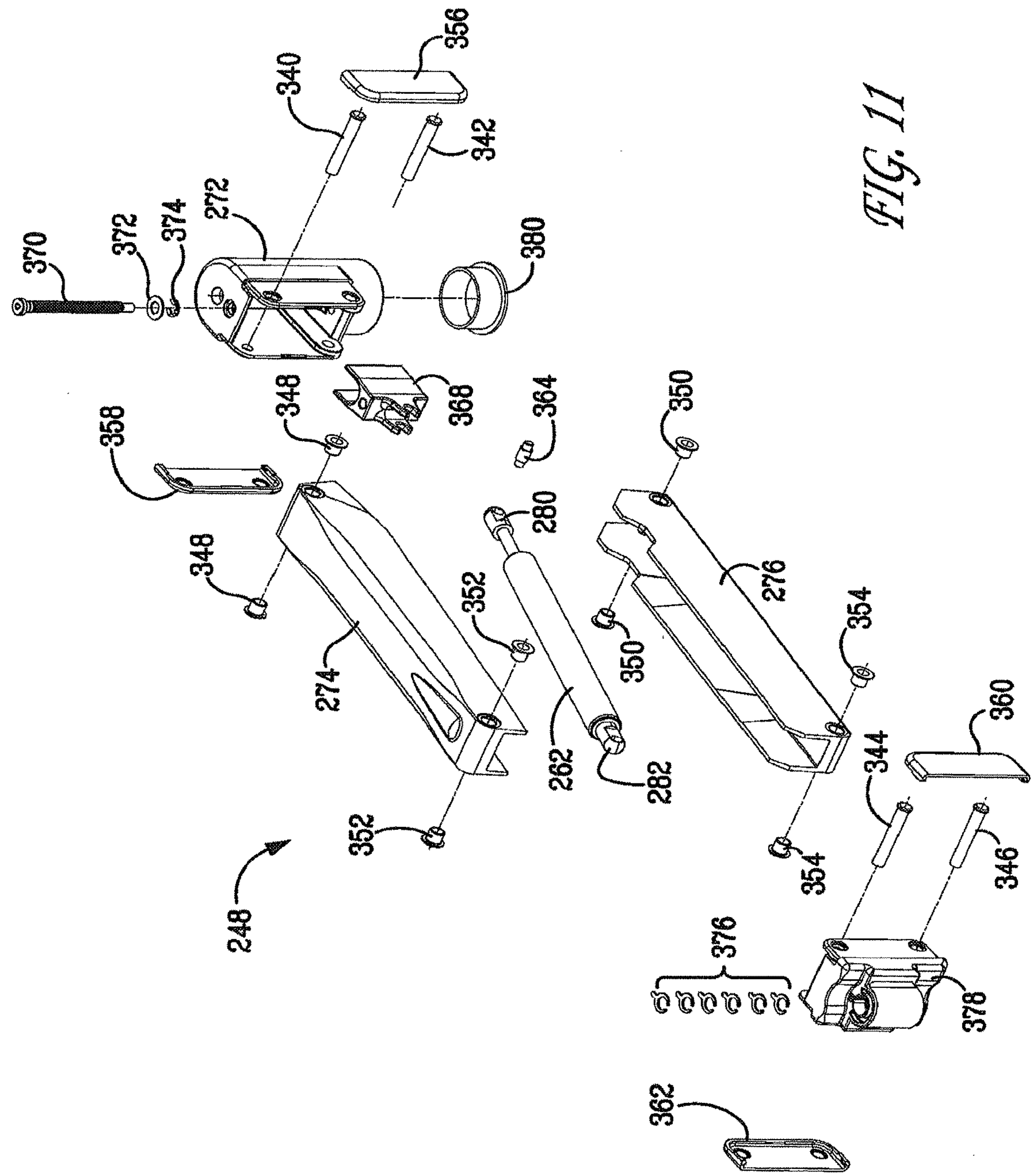
FIG. 11 is an exploded view of the second arm of the display supporting apparatus according to the present invention.
Figure 12:
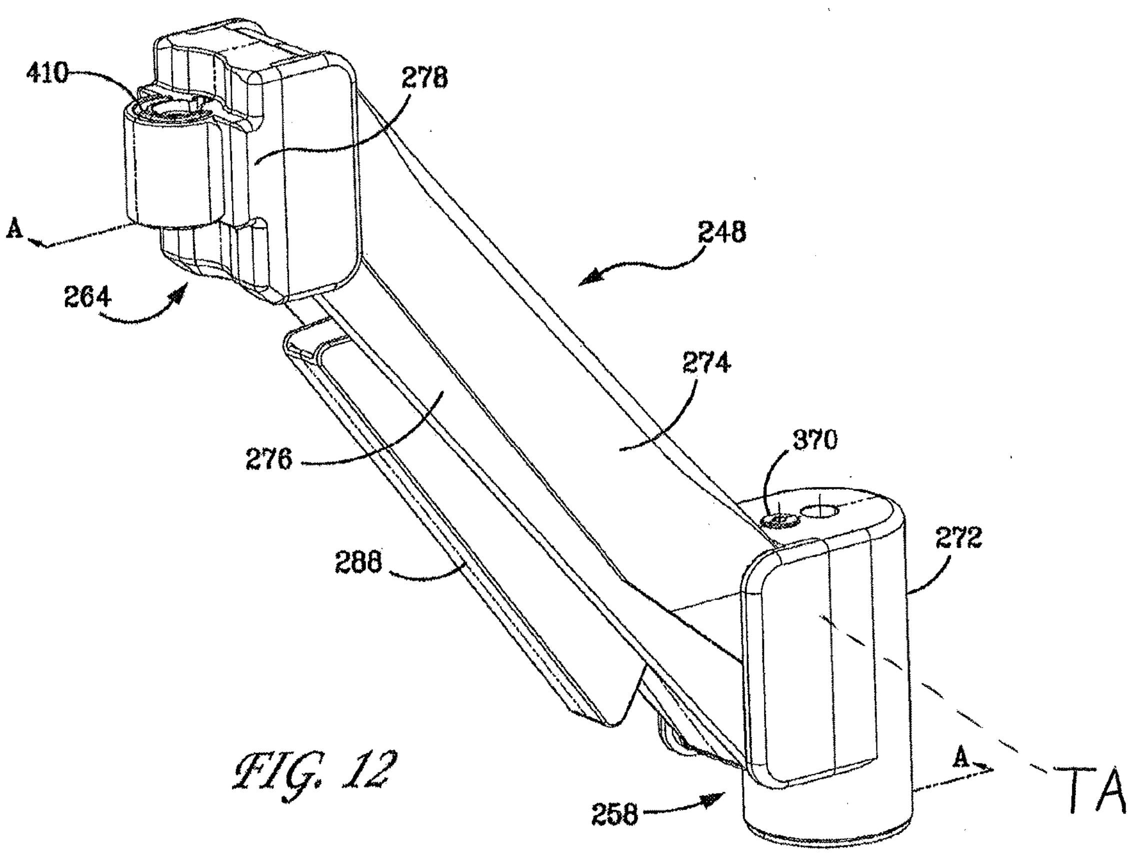
FIG. 12 is a perspective view of the second arm of the display supporting apparatus according to the present invention.
Figure 13:
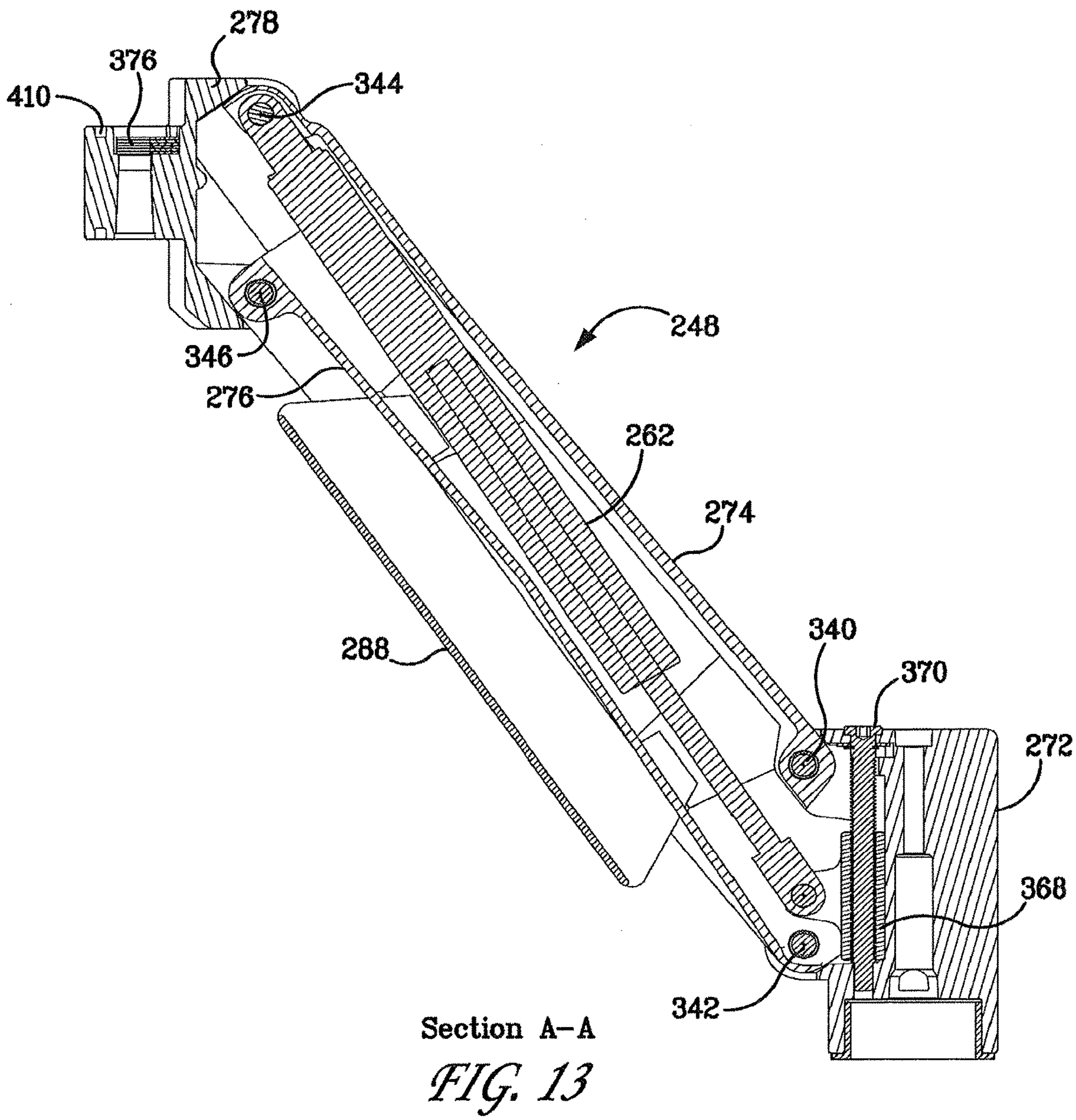
FIG. 13 is a cross sectional view of the second arm of the display supporting apparatus according to the present invention.
Figure 14:
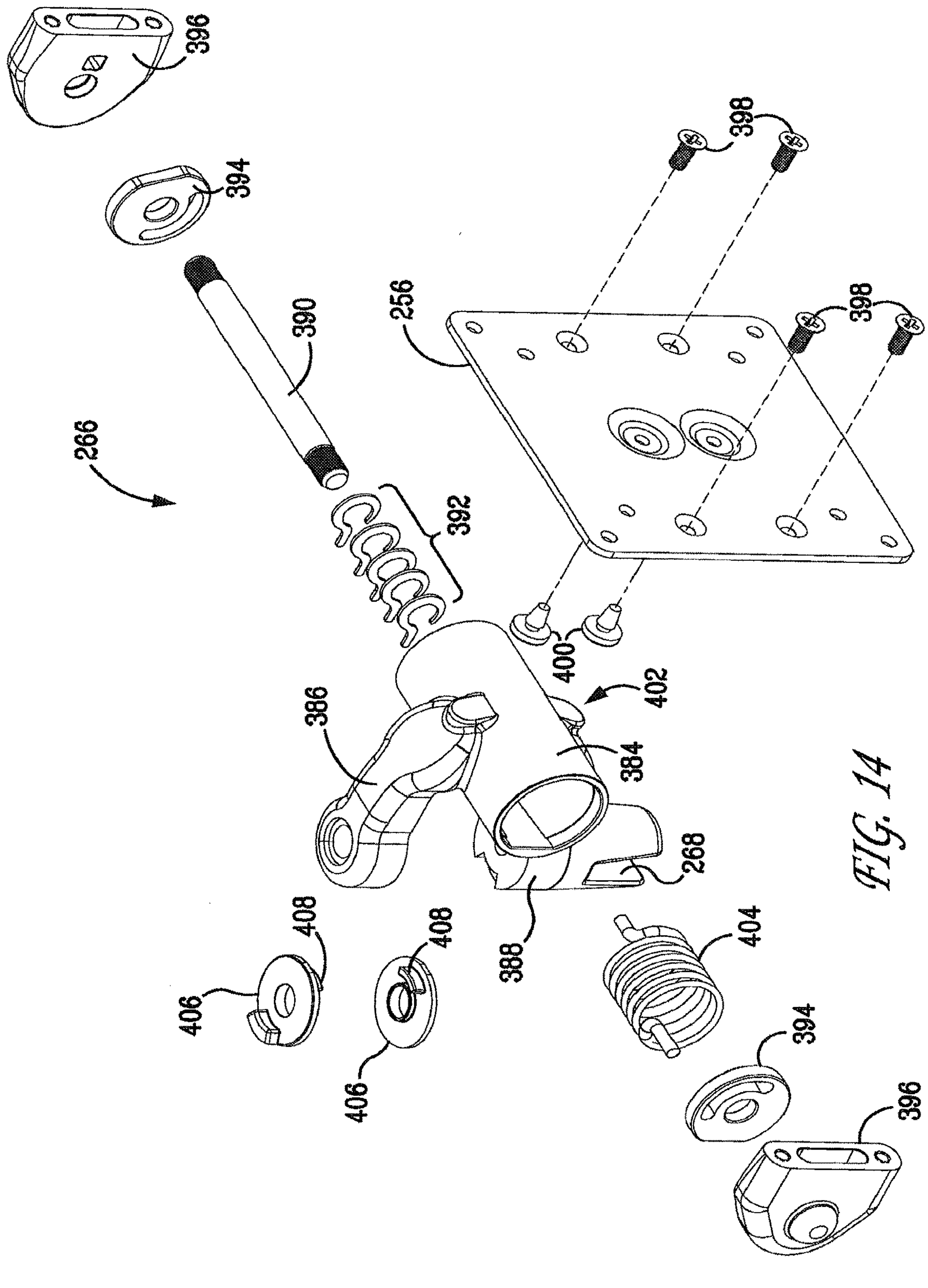
FIG. 14 is an exploded view of the two-axis pivot joint of the display supporting apparatus according to the present invention.
Figure 15:
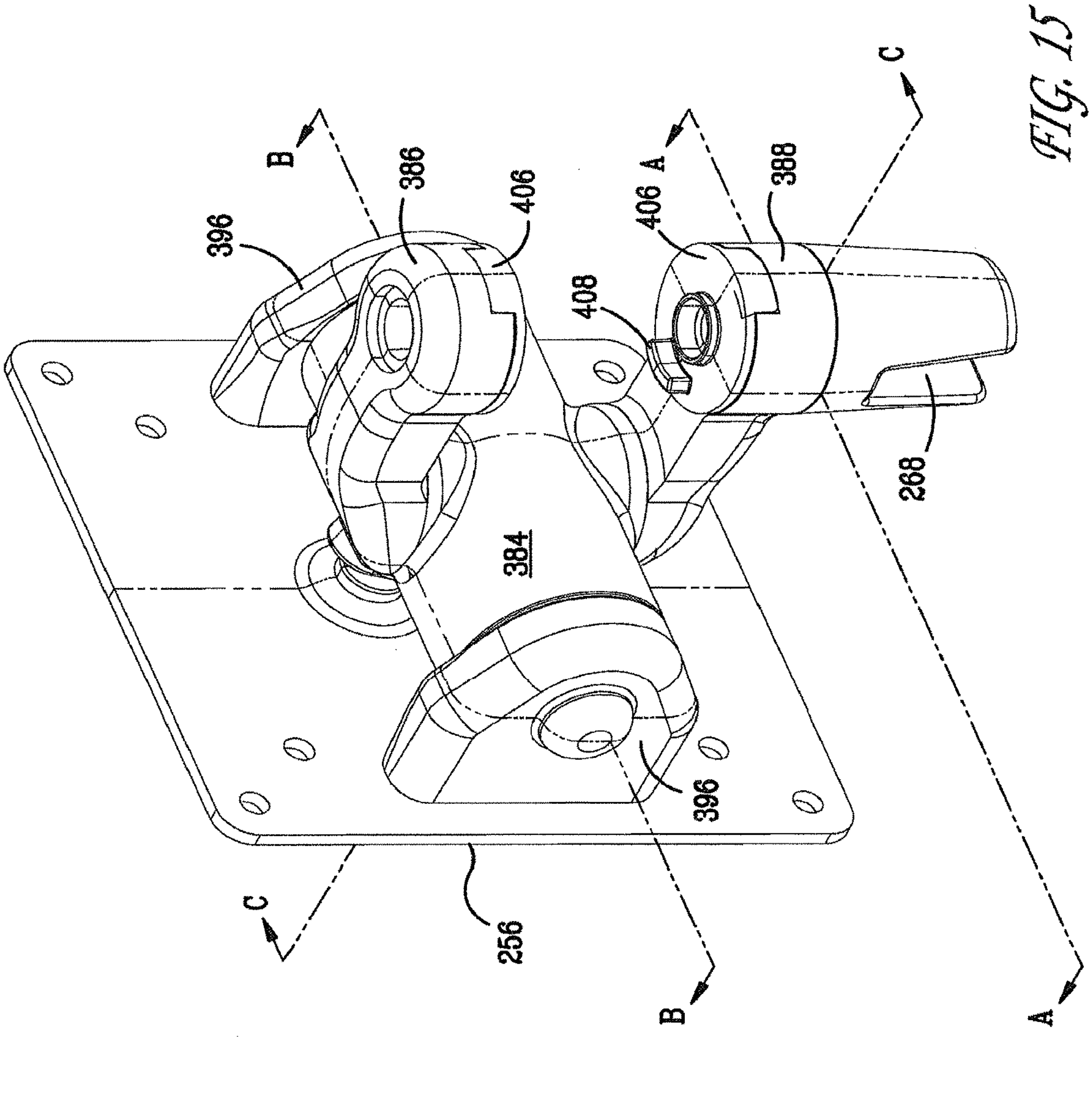
FIG. 15 is a perspective view of the two-axis pivot joint of the display supporting apparatus according to the present invention.
Figure 16:
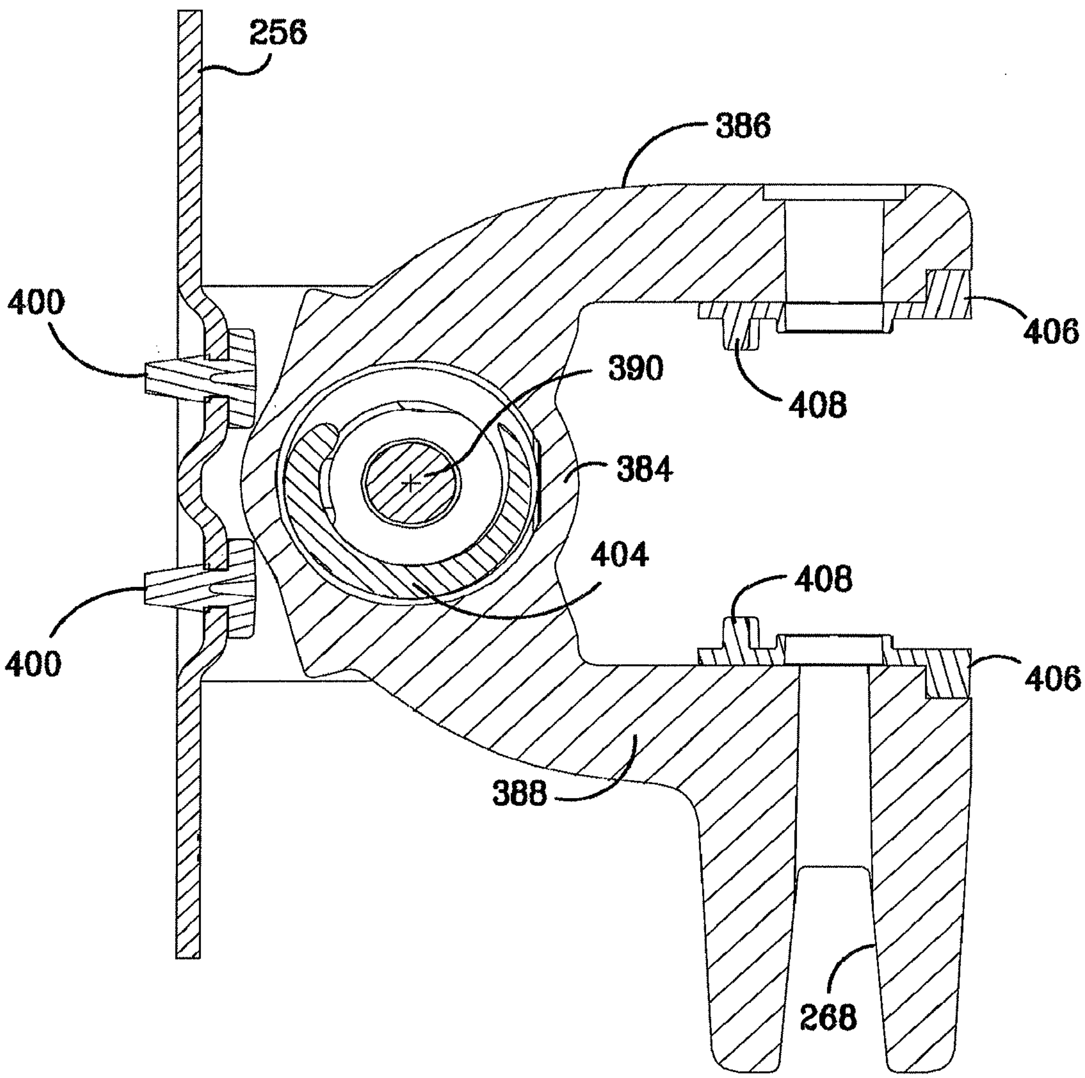
FIGS. 16-18 are cross sectional views of the two-axis pivot joint of the display supporting apparatus according to the present invention.
Figure 17:
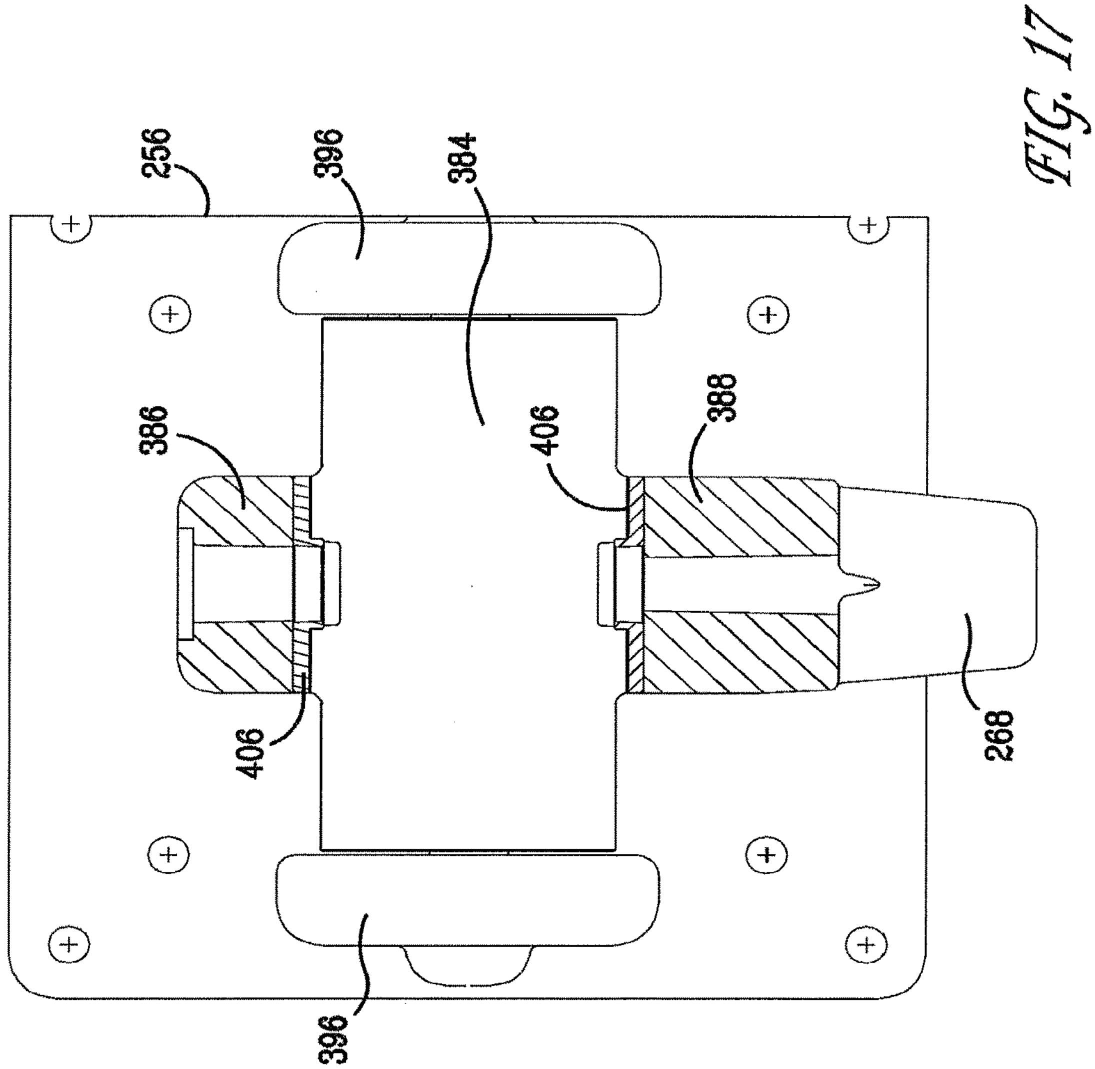
Figure 18:
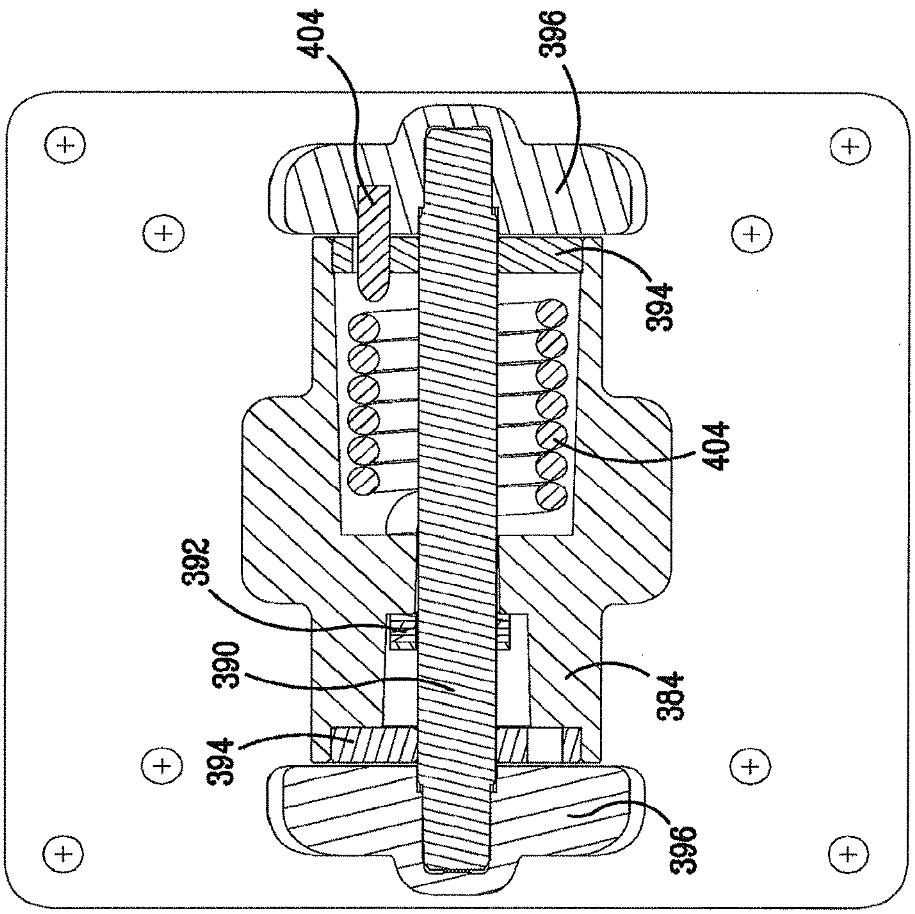
Figure 19:
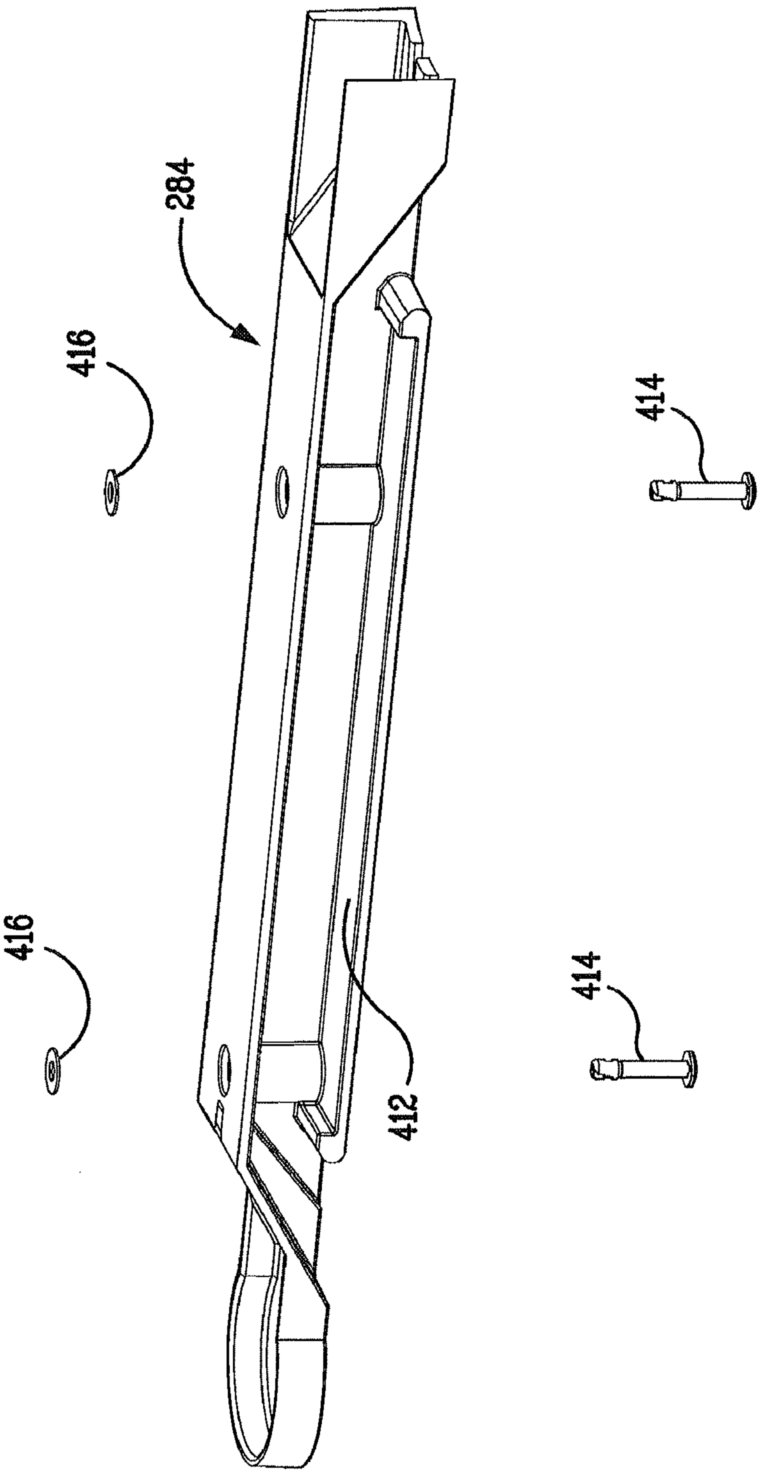
FIG. 19 is an exploded view of the cable tray assembly of the first arm of the display supporting apparatus according to the present invention.
Figure 20:
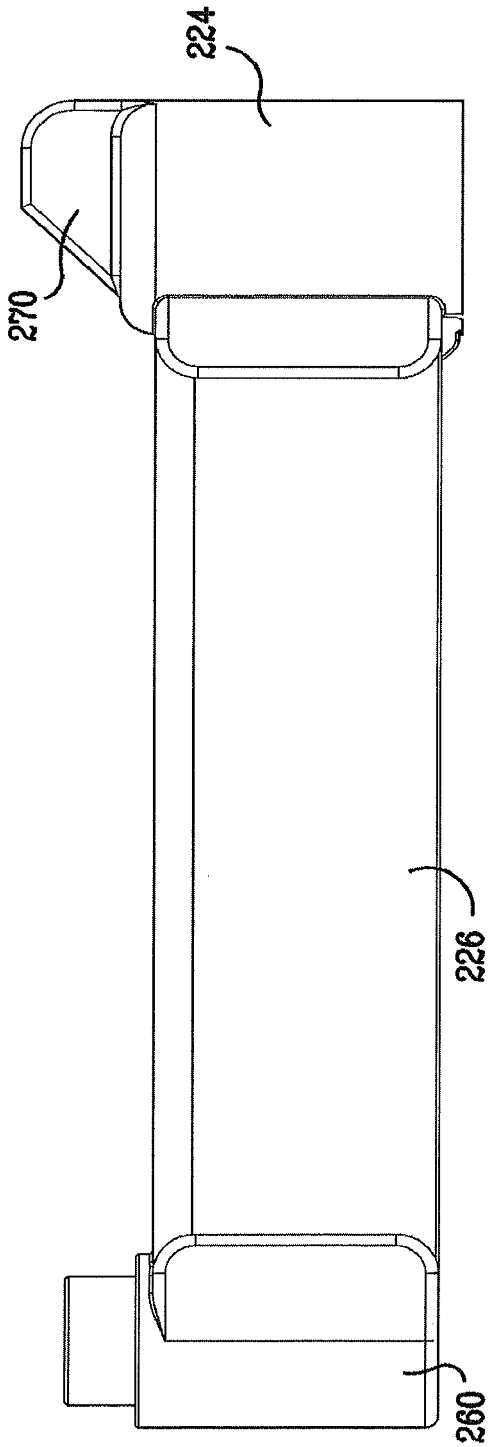
FIGS. 20-23 are views of the first arm of the display supporting apparatus according to the present invention.
Figure 21:
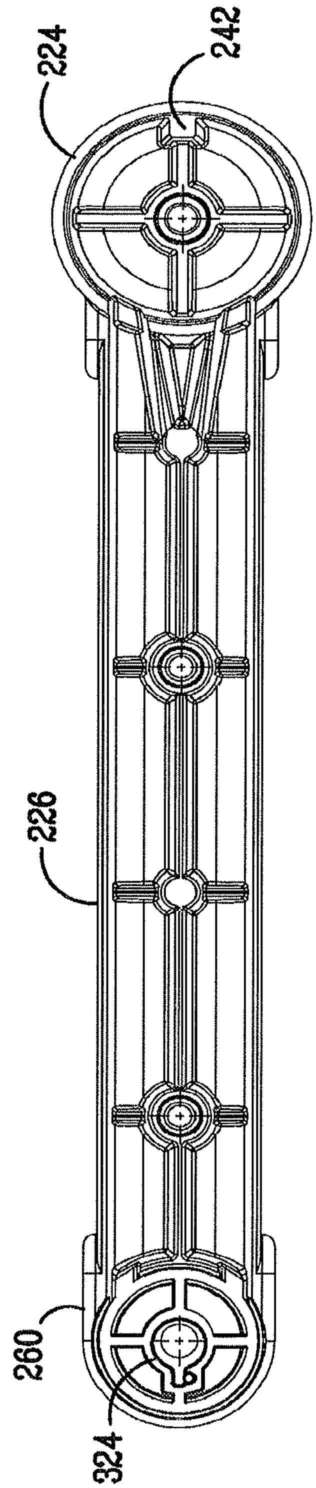
Figure 22:
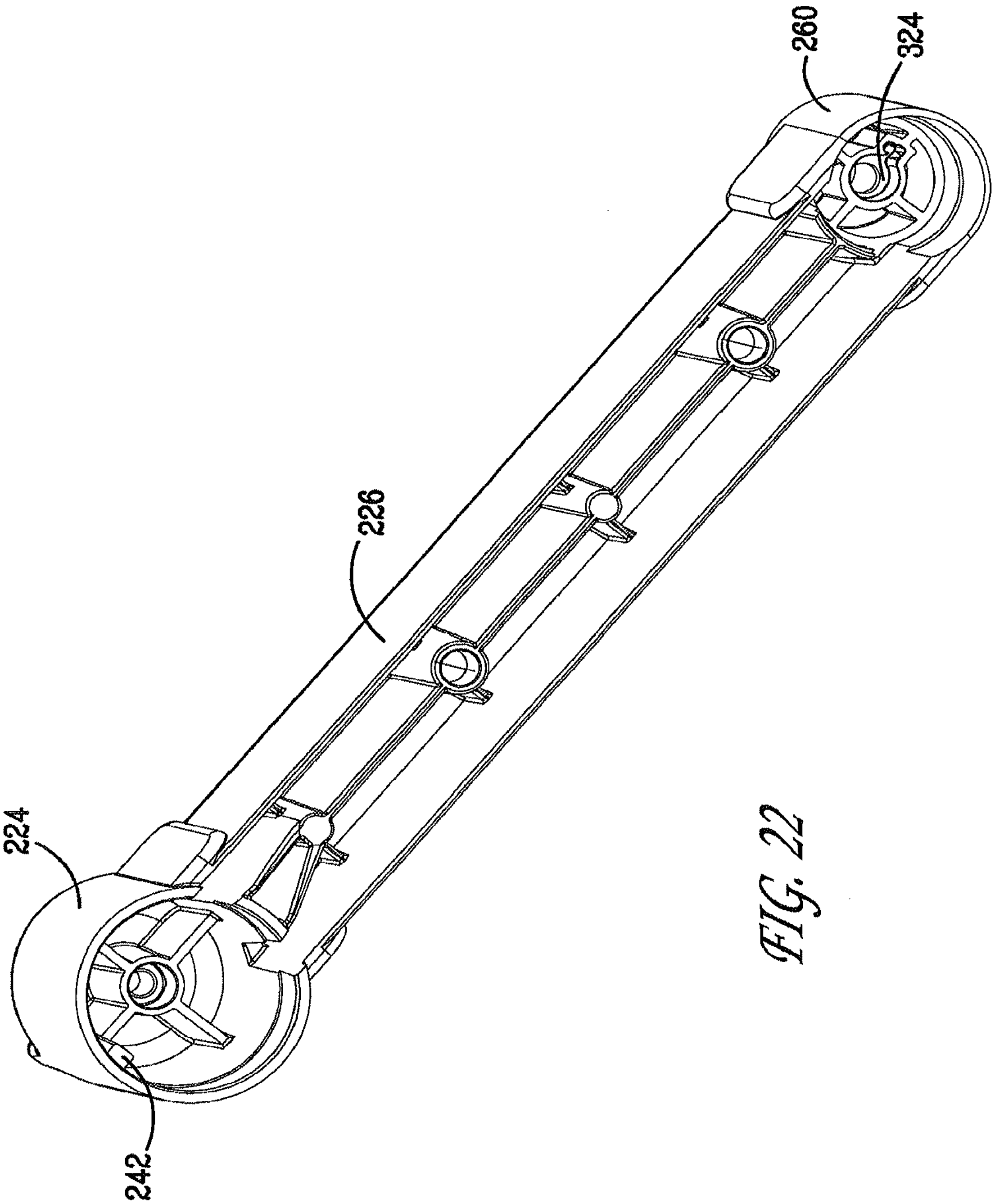
Figure 23:
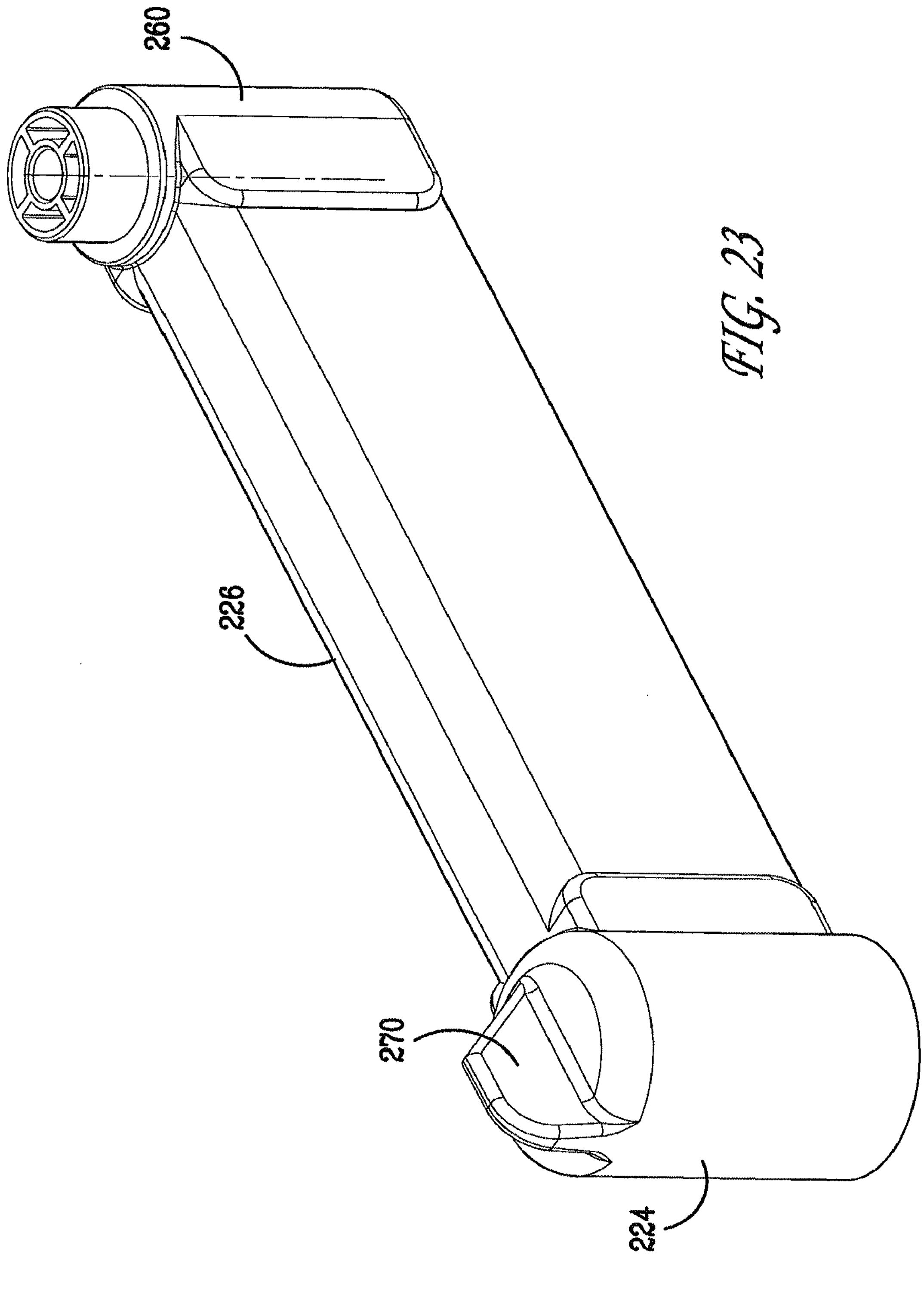
Figure 24:
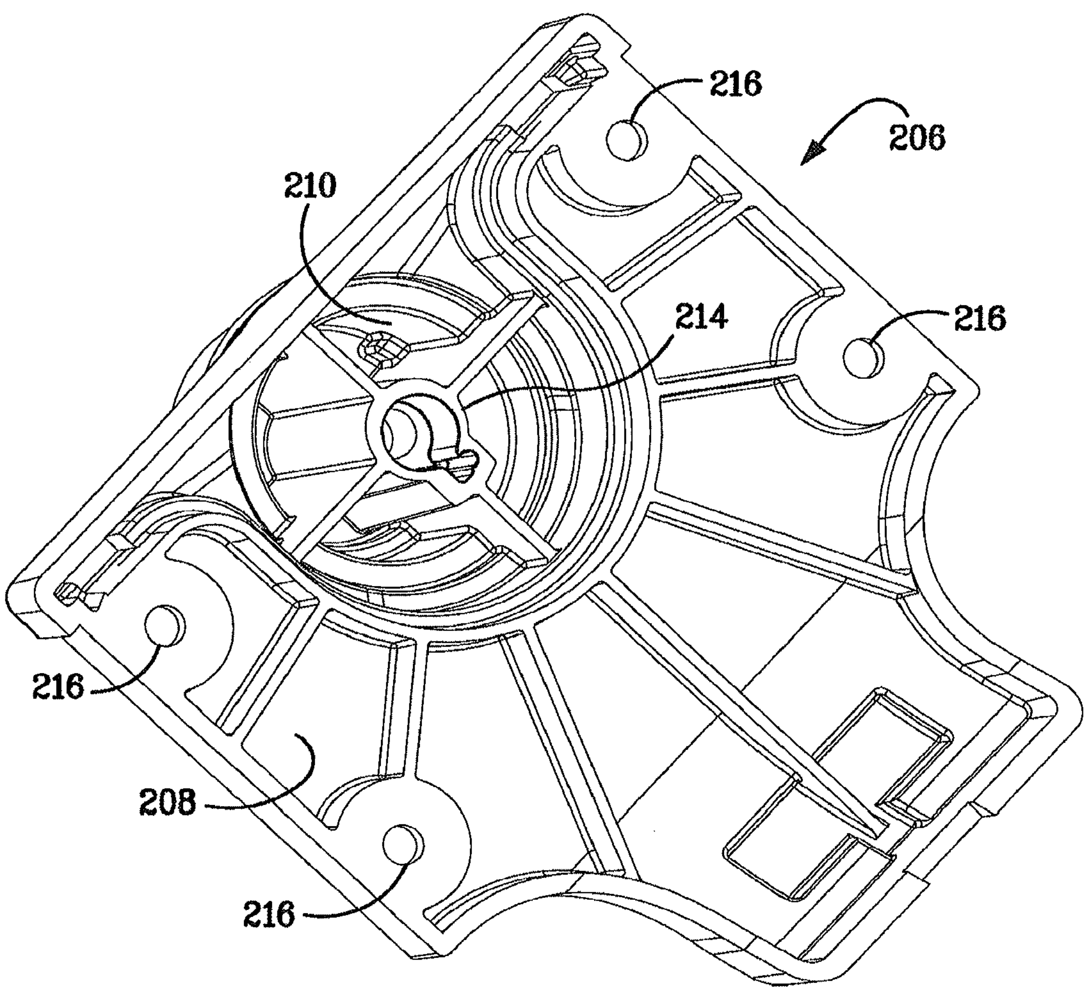
FIGS. 24-25 are views of the base of the display supporting apparatus according to the present invention.
Figure 25:
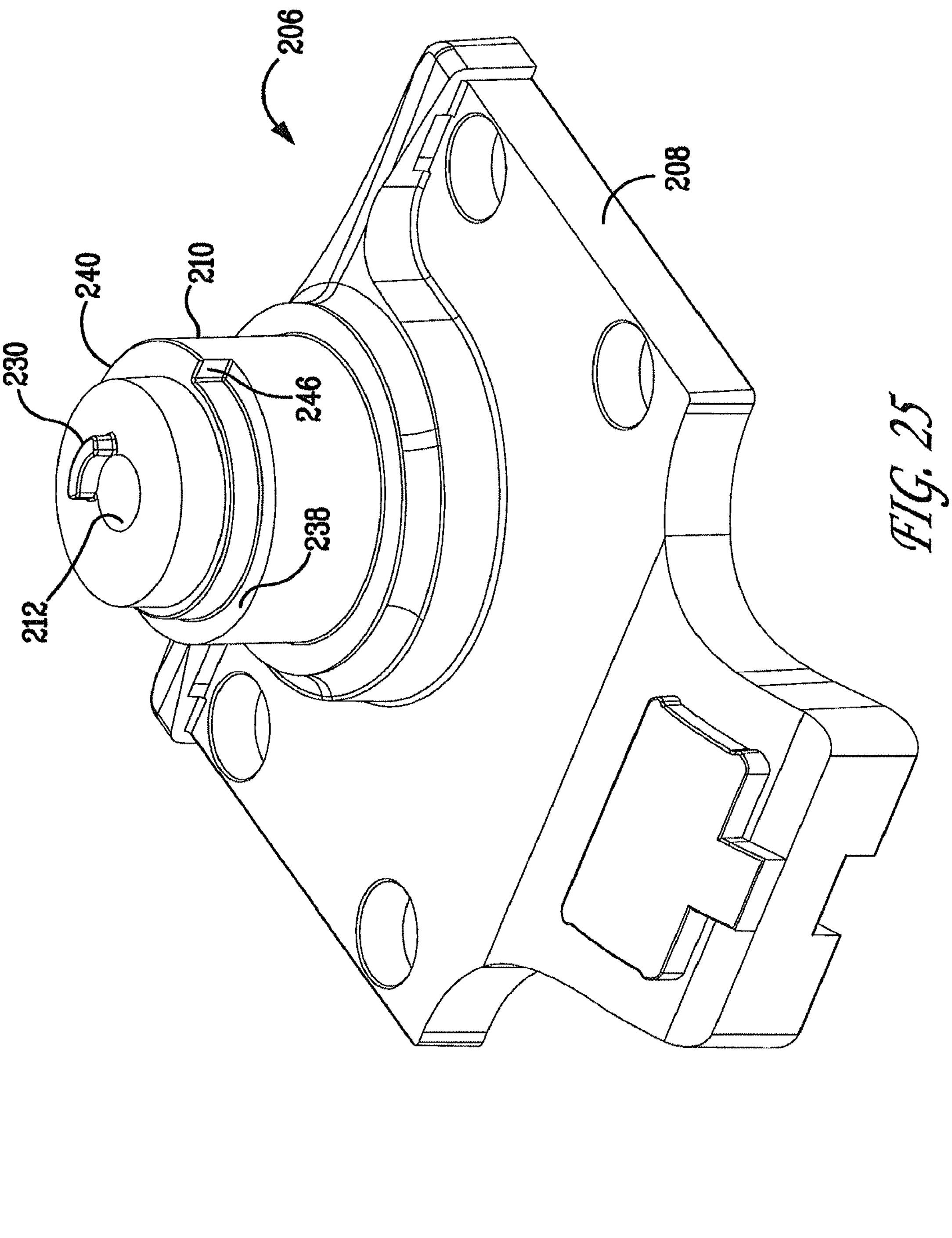
Figure 28:
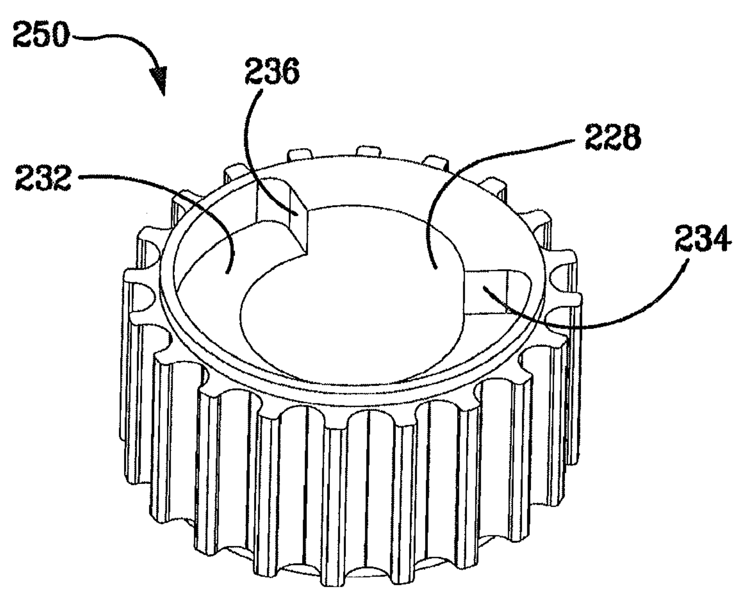
FIGS. 26-28 are views of the first pulley of the display supporting apparatus according to the present invention.
Figure 26:
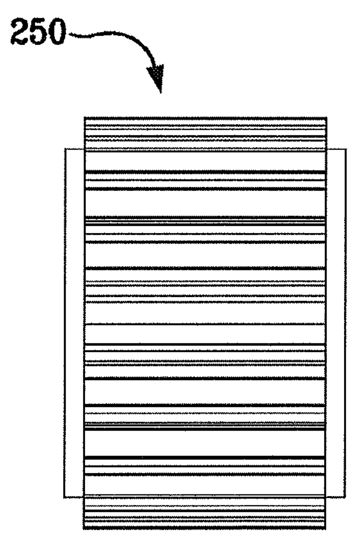
Figure 27:
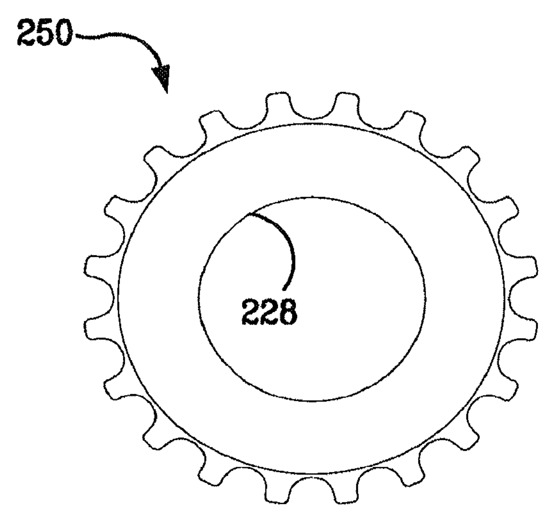
Figure 29:
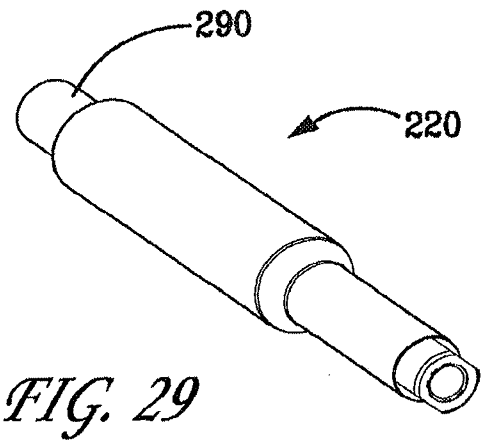
FIGS. 29-31 are views of the first pivot shaft of the display supporting apparatus according to the present invention.
Figure 30:
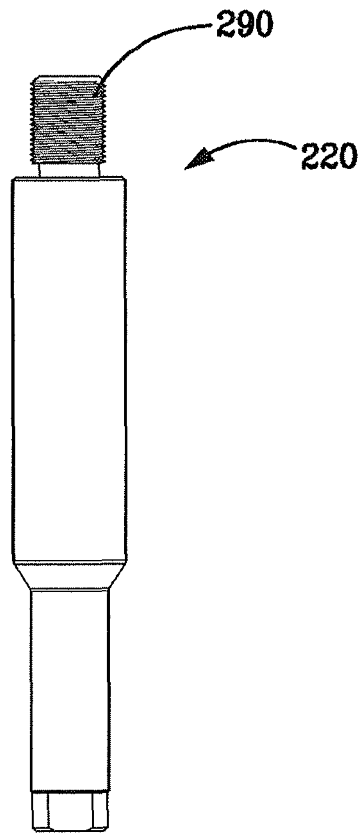
Figure 31:
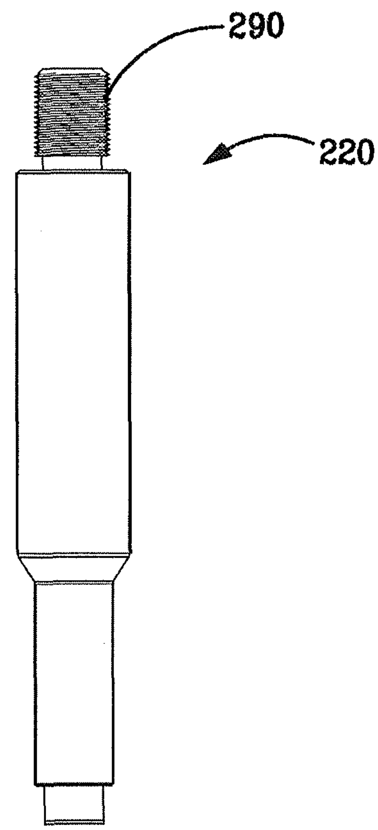
Figure 33:
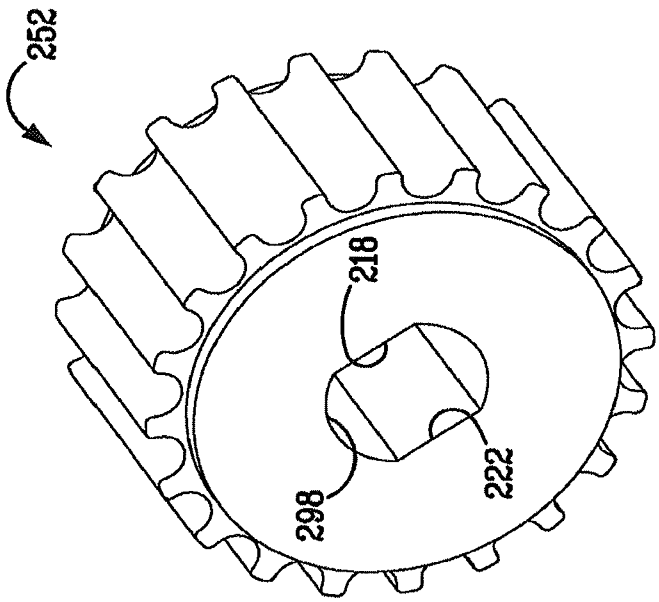
FIGS. 32-33 are views of the second pulley of the display supporting apparatus according to the present invention.
Figure 32:
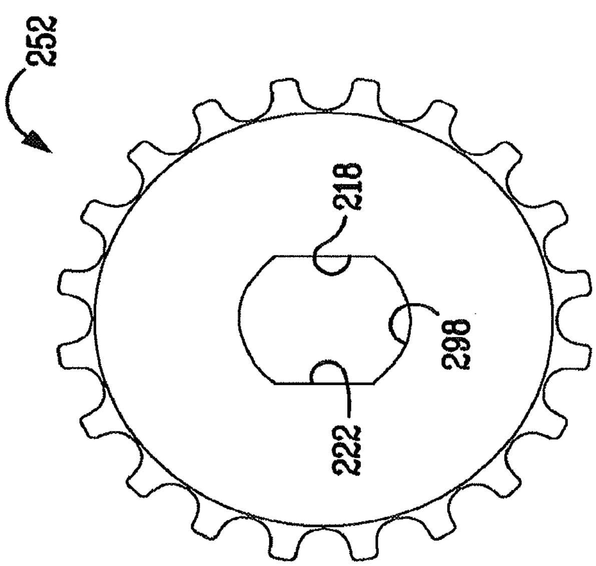
Figure 36:
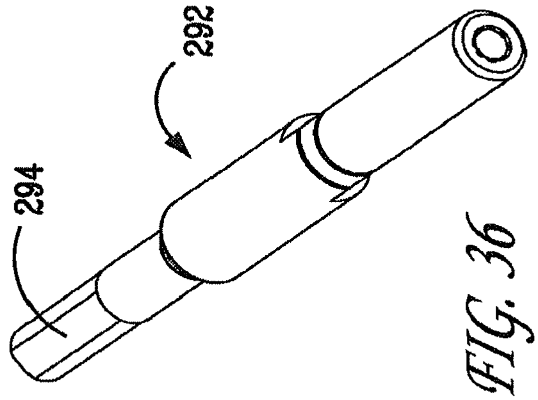
FIGS. 34-36 are views of the second pivot shaft of the display supporting apparatus according to the present invention.
Figure 34:
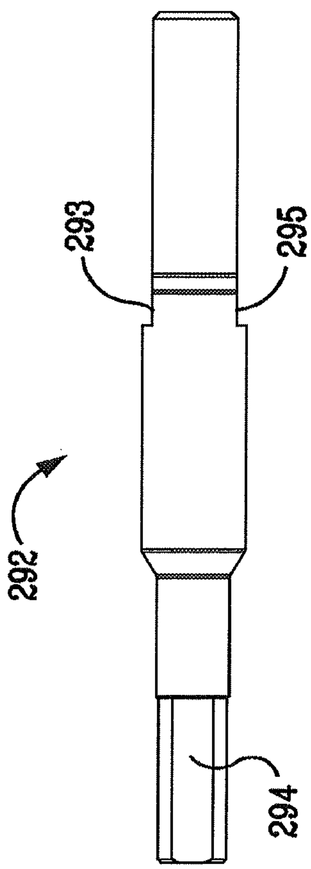
Figure 35:
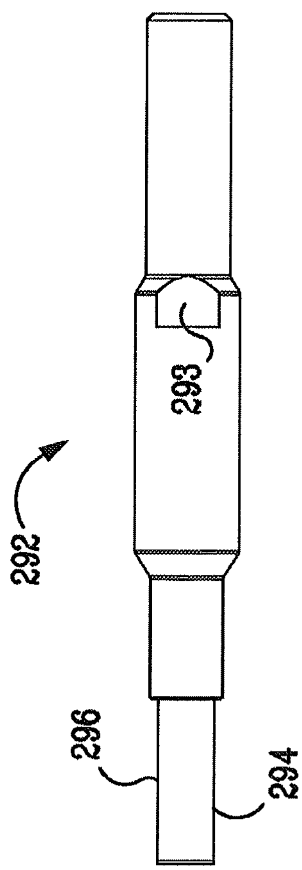
Figure 37:
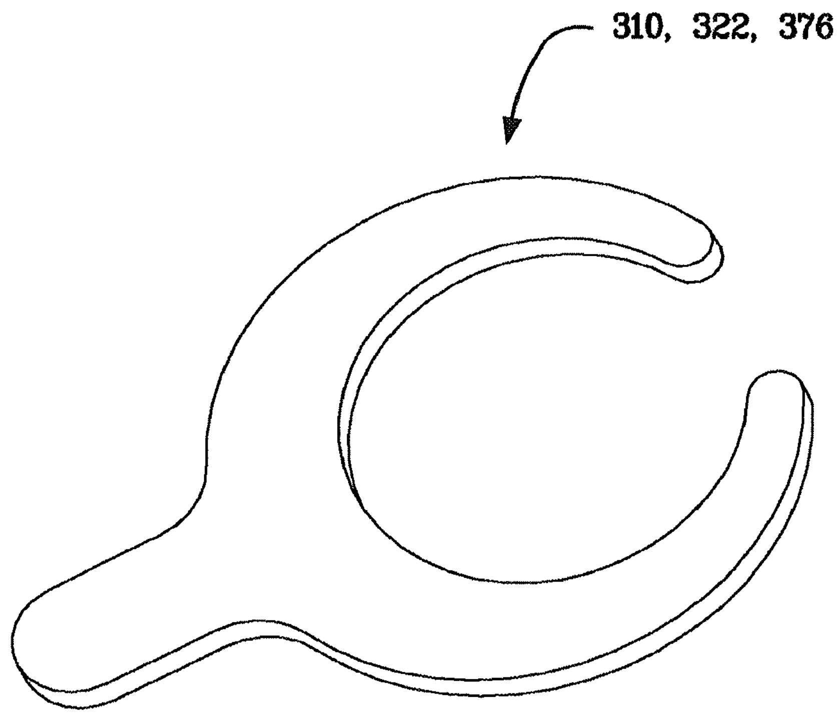
FIG. 37 is a perspective view of a symmetrical friction element of the display supporting apparatus according to the present invention.
Figure 38:
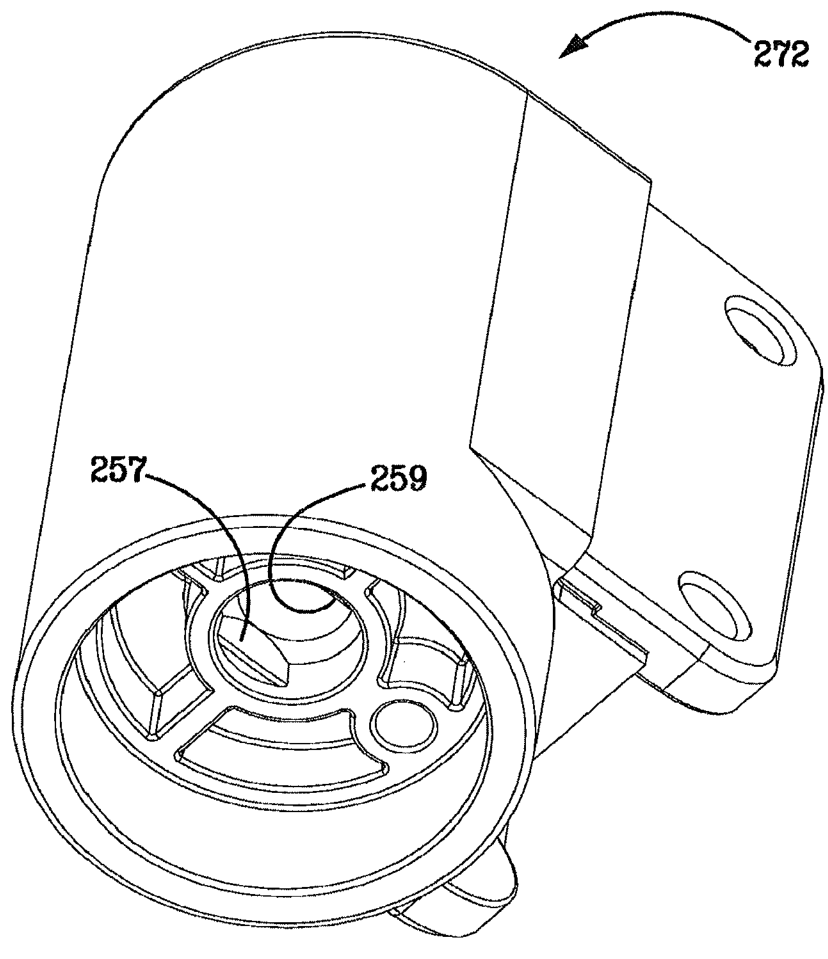
FIGS. 38-39 are views of the first knuckle of the display supporting apparatus according to the present invention.
Figure 39:
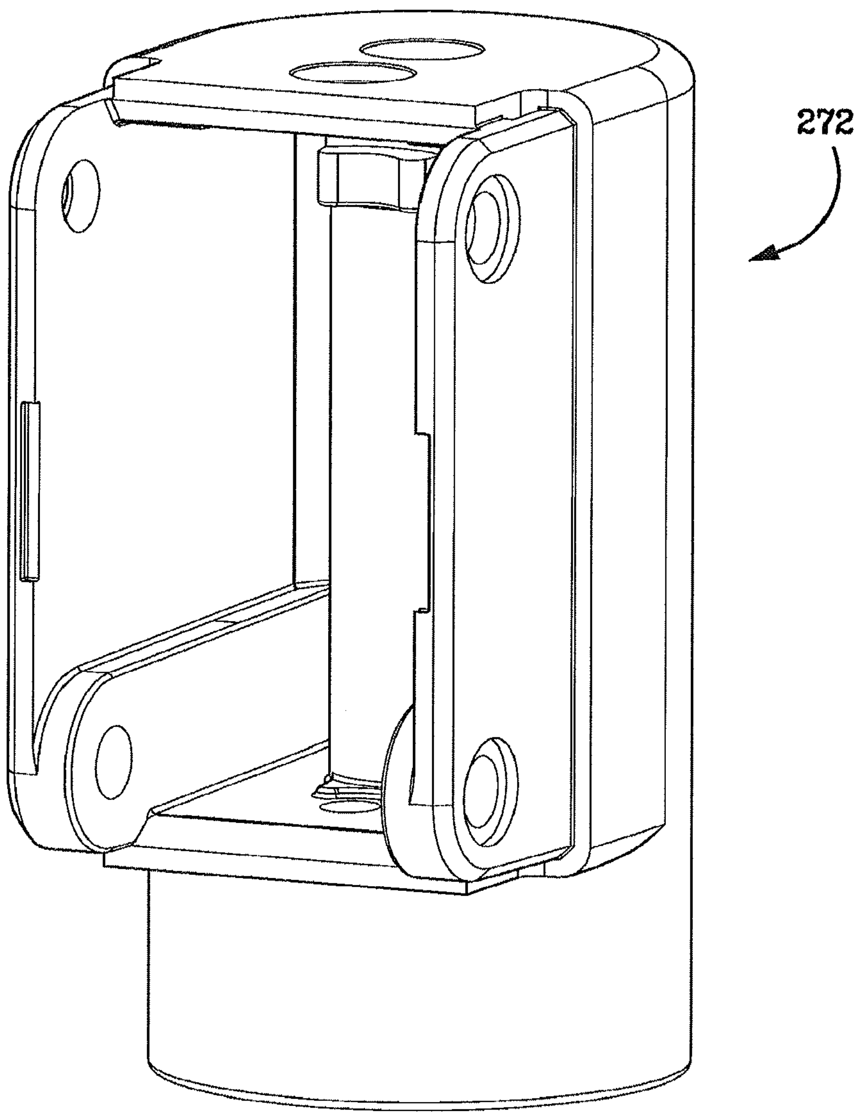
Figure 40:
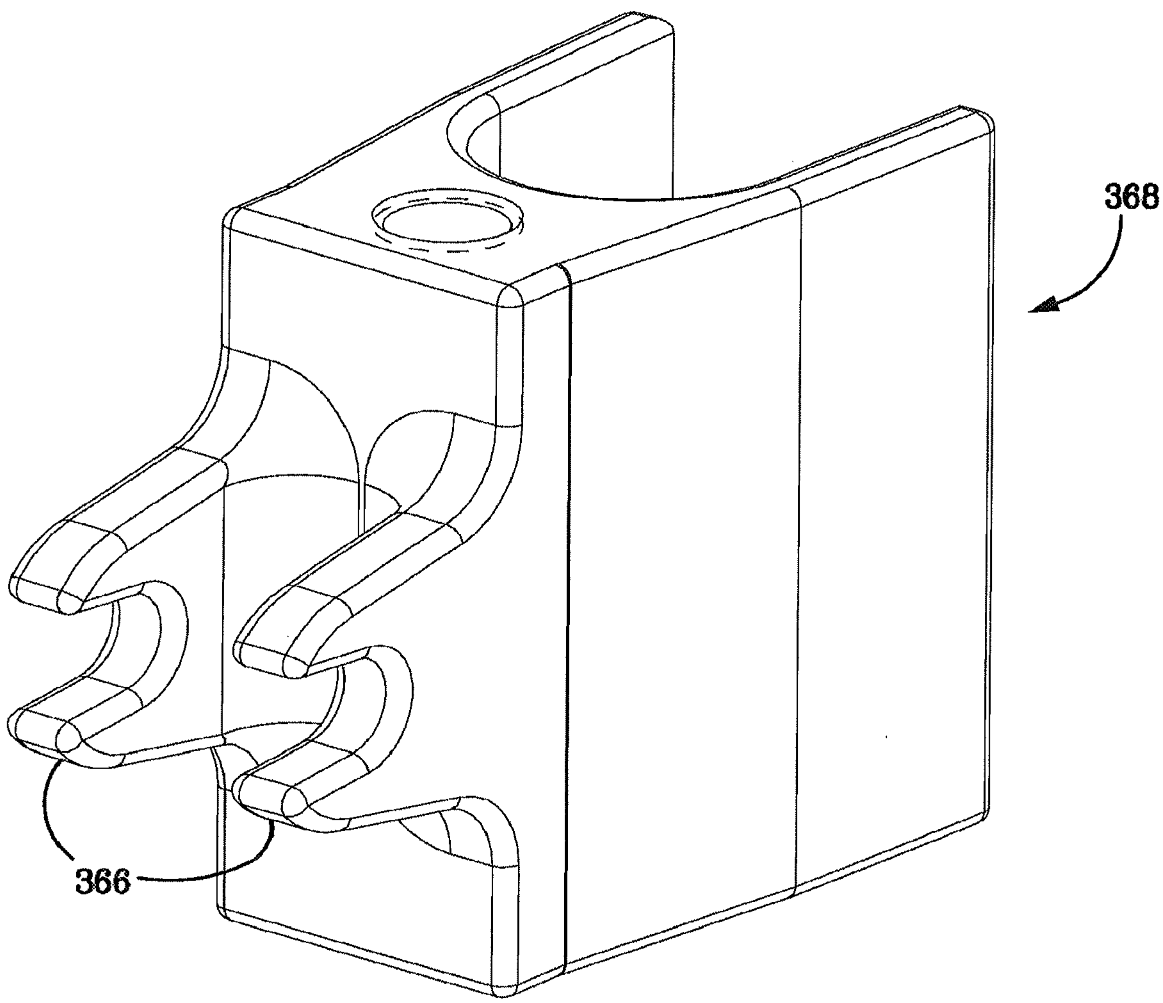
FIG. 40 is a perspective view of the adjustment bridge of the display supporting apparatus according to the present invention.
Figure 41:
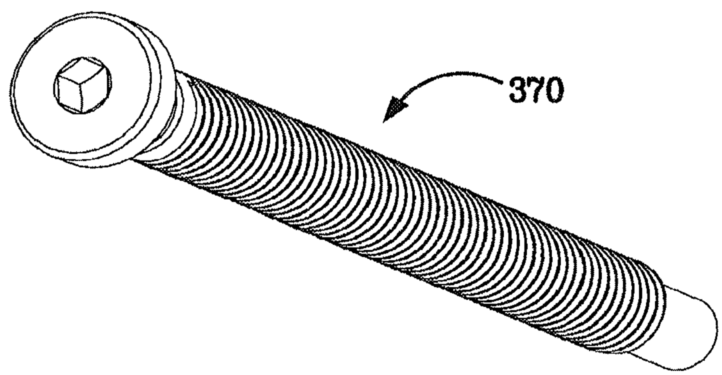
FIGS. 41-42 are views of the adjustment screw of the display supporting apparatus according to the present invention.
Figure 42:
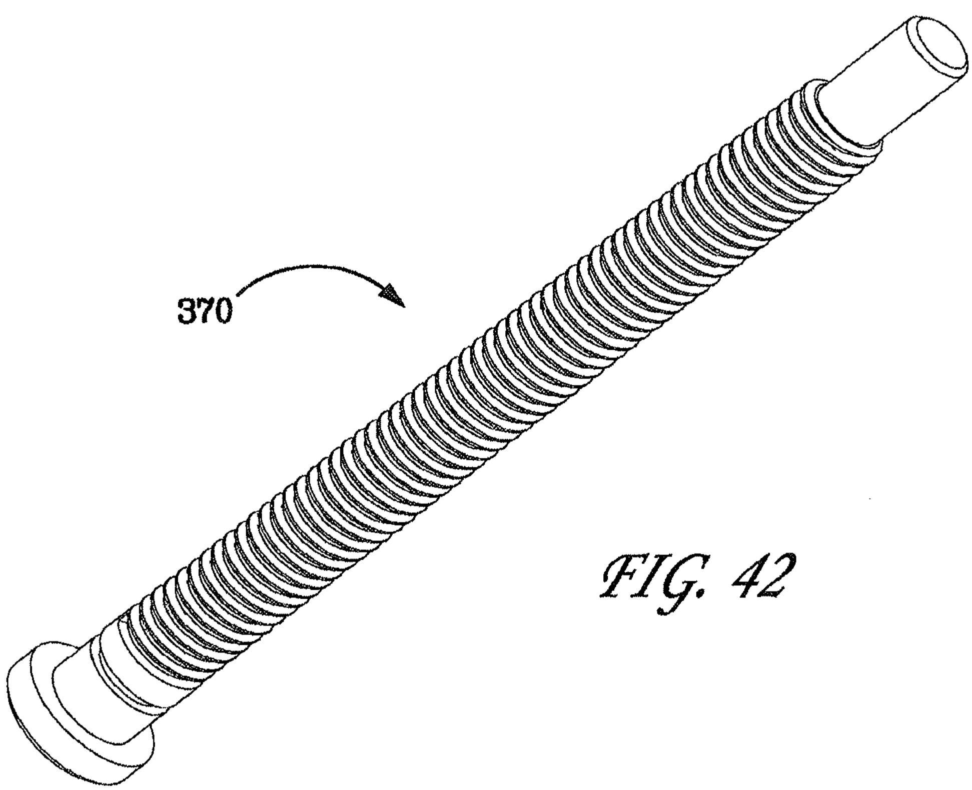
Figure 43:
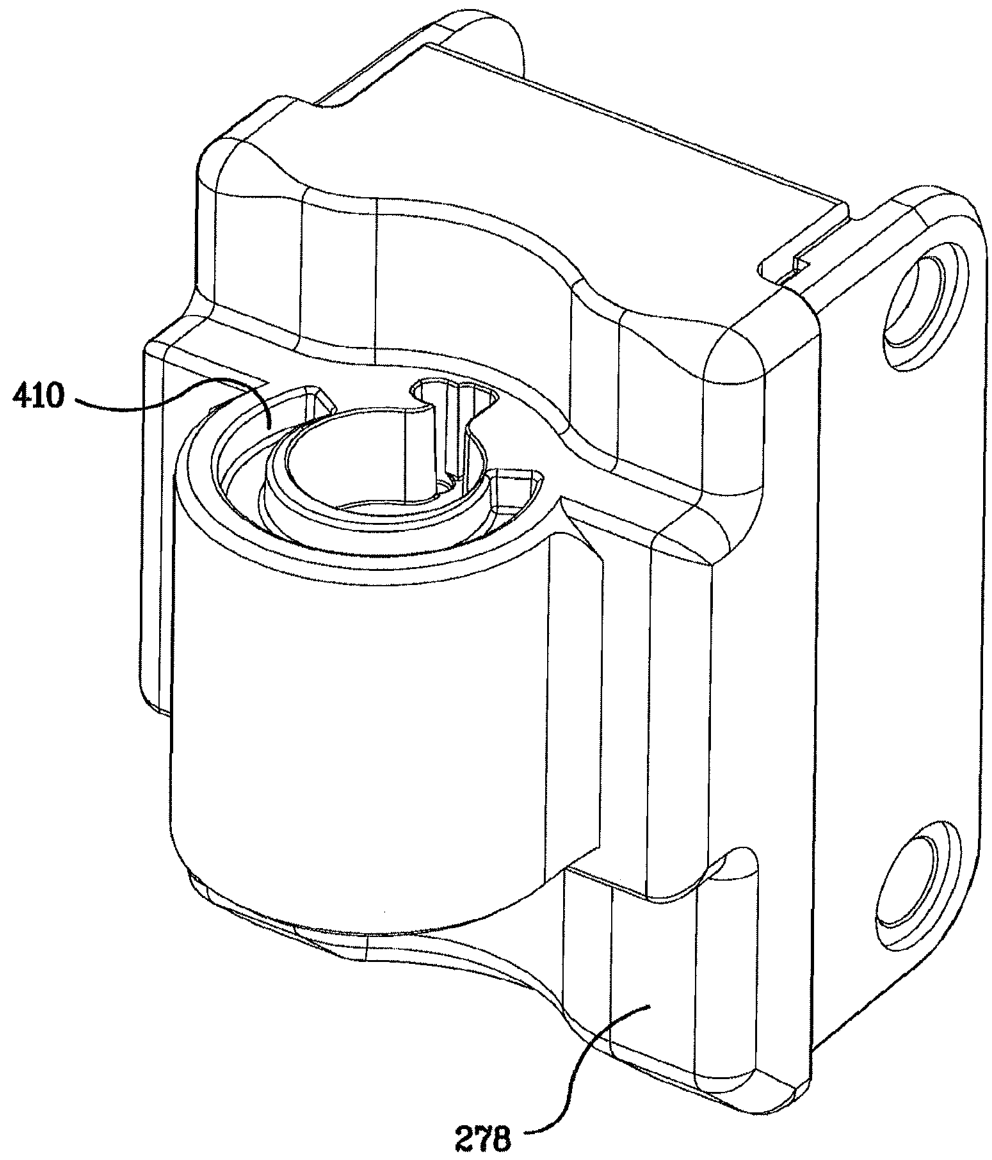
FIG. 43 is a perspective view of the second knuckle of the display supporting apparatus according to the present invention.
Figure 44:
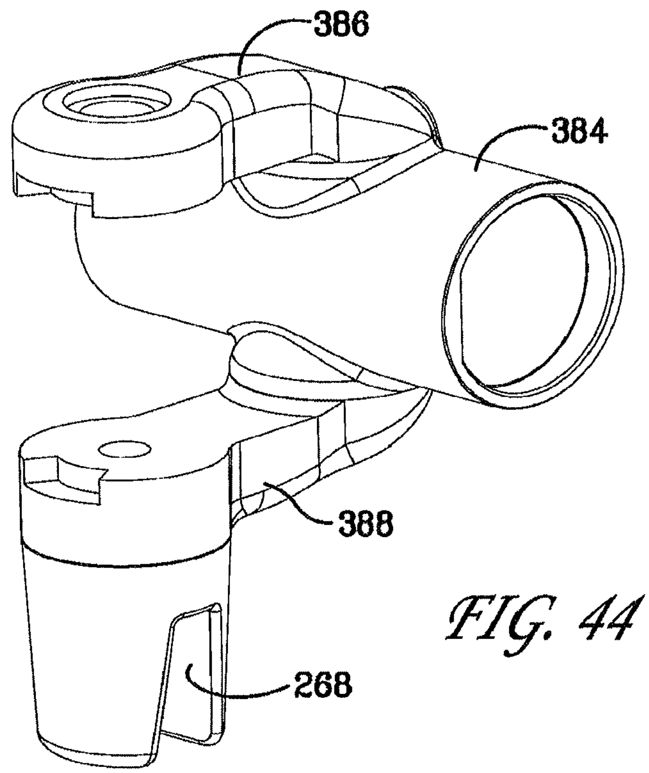
FIGS. 44-46 are views of the housing of the two-axis pivot joint of the display supporting apparatus according to the present invention.
Figure 45:
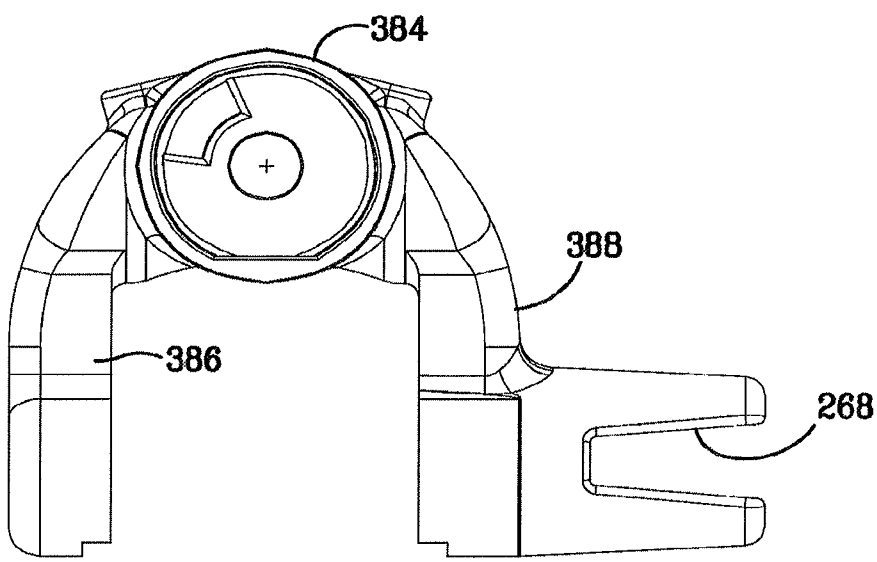
Figure 46:
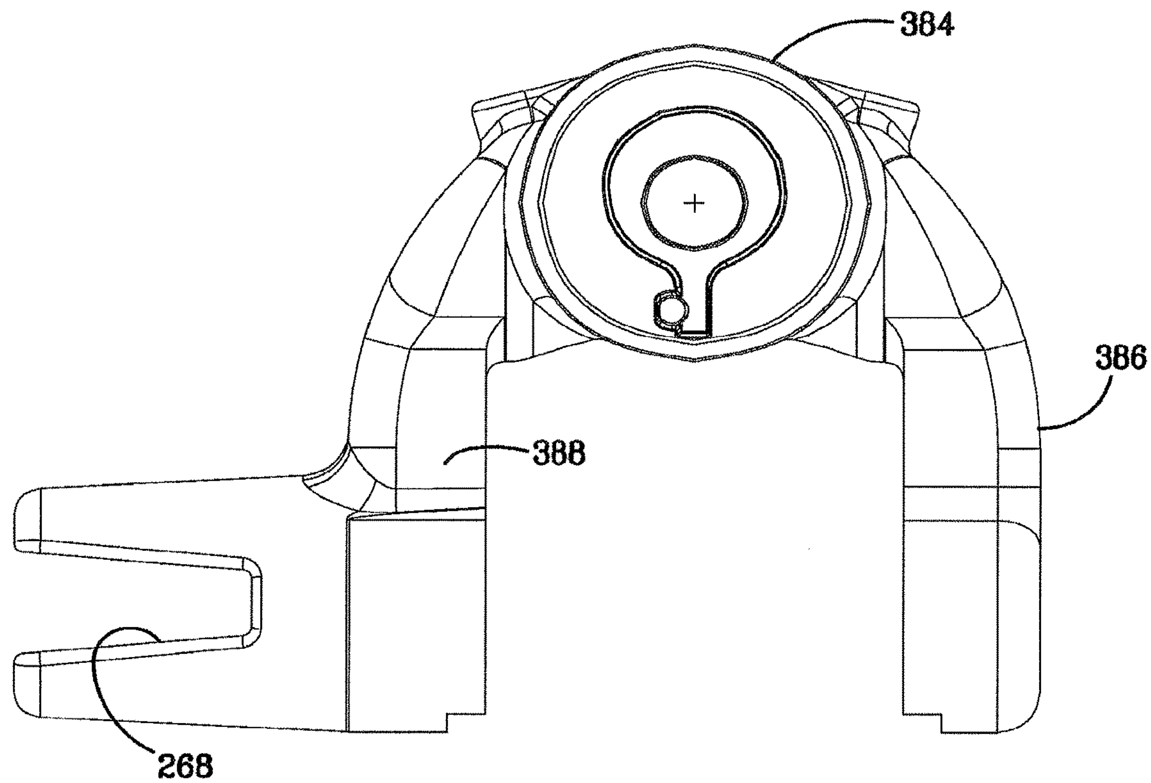
Figure 47:
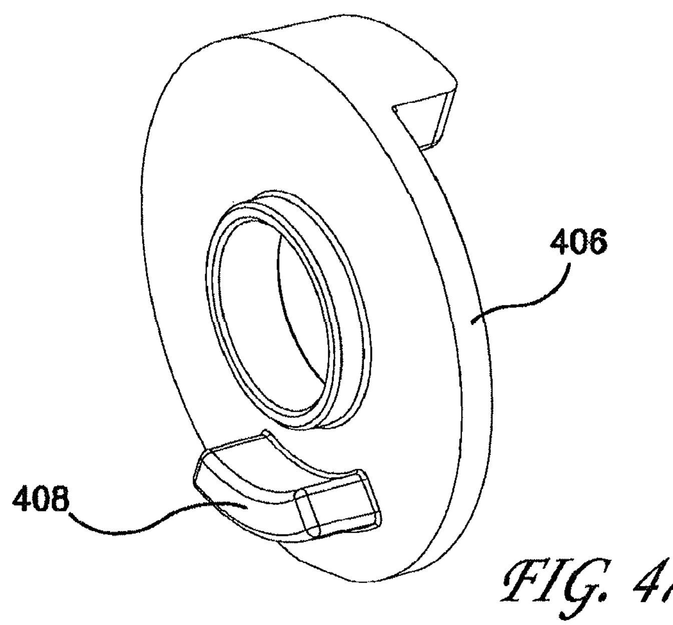
FIGS. 47-48 are views of one of two rotation limiting washers of the display supporting apparatus according to the present invention.
Figure 48:
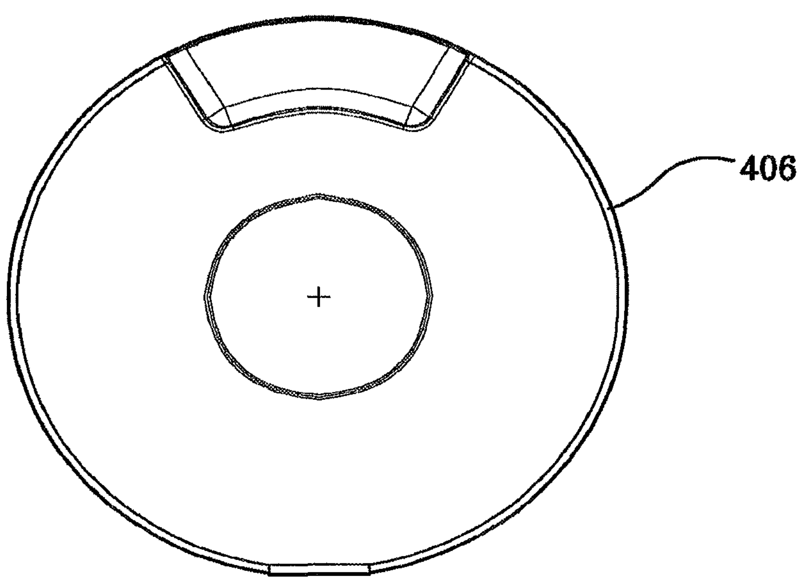

Referring to FIGS. 1-48, the preset invention is directed to a display supporting apparatus 200 for supporting a display 202 at a user selected location or position within its operational range relative to a support structure 204. In the illustrated example, the support structure is a mobile cart 204 that has wheels or casters. The wheels or casters on such carts are usually provided with locks or brakes that selectively prevent the rotation of the wheels or casters. The carts carry equipment that displays information or images on the display 202. Referring to FIGS. 1-3, the display supporting apparatus 200 can be seen supporting the display 202 in relation to the support structure 204.

The supporting apparatus 200 includes a base 206 for mounting the apparatus 200 to the cart 204 or other supporting structure. The base 206 is in the form of a base plate 208 having a cylindrical projection 210 projecting outward from approximately the center of the base plate 208. The cylindrical projection 210 is in part hollow and has a hole 212 provided at its end farthest from the base plate 208. The hole 212 communicates with a cylindrical sleeve 214 positioned within the cylindrical projection 210. The base plate 208 of the base 206 also has a plurality of holes 216 that allow the base 206 to be attached to the cart or supporting structure 204 using appropriate fasteners. Fasteners, for example the screws, can be placed through the holes 216 to attach the base 206 to, for example, the cart 204. The end of the cylindrical projection 210 that is attached to the base plate 208 is open to allow the installation of the first pivot shaft 220.

The display support apparatus 200 further includes a first arm 226 that has a range of rotation about a first pivot axis between the first arm 226 and the base 206. The first pivot shaft 220 is fixedly attached to the first end 224 of the first arm 226. The first pulley 250 is rotationally supported by the base 206. The first pulley 250 is positioned over the cylindrical projection 210 and the first pulley 250 has a center hole 228 that registers with the hole 212 of the cylindrical projection 210. The first pivot shaft 220 is positioned to extend through the center hole 228 of the first pulley 250, the hole 212 of the cylindrical projection 210, and the cylindrical sleeve 214 of the cylindrical projection 210. Both the first pivot shaft 220 and the first pulley 250 can rotate relative to the base 206 about a first pivot axis defined by the longitudinal axis of the first pivot shaft 220. The first pulley 250 is free to rotate relative to the first pivot shaft 220. A peg 230 projects outward from the cylindrical projection 210 of the base 206 proximate the hole 212 of the cylindrical projection 210. The peg 230 is in engagement with an arc shaped groove 232 formed in the first pulley 250 to limit the range of rotation of the first pulley 250 relative to the base 206. The peg 230 engages the closed ends 234 and 236 of the groove 232 to limit the range of rotation of the first pulley 250 relative to the base 206 to approximately 180°.

The cylindrical projection 210 has an arc shaped depression 238 that extends along a portion of the rim of the end 240 of the cylindrical projection 210 that is farthest from the base plate 208. The first end 224 of the first am 226 has a lug 242 that engages the closed ends 244 and 246 of the depression 238 to limit the range of rotation of the first arm 226 relative to the base 206 to approximately 180°. Accordingly, the closed ends 244 and 246 of the depression 238 define rotation stops that limit the range of rotation of the first arm 226 relative to the base 206 about the first pivot axis.

The display support apparatus 200 further includes a second arm 248 that has a range of rotation about a second pivot axis between the first arm 226 and the second arm 248, and the display support apparatus 200 includes a mechanism for providing a constant orientation relative to the base 206 for a plane, referred to hereinafter as the bisector plane for the second arm, containing the second pivot axis and bisecting an angle defined by the range of rotation of the second arm 248 about the second pivot axis. The mechanism for providing a constant orientation relative to the base 206 for the bisector plane for the second arm preferably includes a torque transfer arrangement that imparts rotation to the second arm 248 whenever necessary to keep the second arm within ±90° of the bisector plane for the second arm. Suitable mechanisms include but are not limited to belt and pulley systems, drive shaft and bevel gear systems, and chain and sprocket systems.

In the illustrated embodiment, the torque transfer arrangement includes a first pulley 250, a second pulley 252, and a belt 254 looped around the first pulley 250 and the second pulley 252, such that rotation of the first pulley 250 relative to the first end 224 of the first arm 226 causes rotation of the second pulley 252 relative to the second end 260 of the first arm 226. The belt 254 is in the form of a closed loop, also known as an endless loop. In the illustrated embodiment, the pulleys 250 and 252 and the belt 254 are of the toothed variety.

The display support apparatus 200 also includes a display attachment plate or bracket 256 that is attached to the second arm 248. The second arm 248 has a longitudinal axis. The first end 224 of the first arm 226 is pivotally attached to the base 206 by a first pivot mechanism to provide for the pivotal attachment of the first arm 226 to the base 206. The first end 258 of the second arm 248 is pivotally attached to the second end 260 of the first arm 226 by a second pivot mechanism to provide for the pivotal attachment of the second arm 248 to the first arm 226 about a transverse axis TA (see FIG. 12). The second arm 248 is of a four-link configuration that allows the up-and-down movement of the display attachment bracket 256 without affecting the orientation of the display attachment bracket 256 relative to the base 206. The second arm 248 also includes a telescoping gas strut 262 to counter balance the weight of the display 202 so as to maintain the vertical position of the display 202 as selected by the user. In addition, the gas strut 262 dampens the up-and-down movement of the display 202 to give the user better control when moving the display vertically.

The gas strut 262 is of a type that includes a cylinder housing a piston and a telescoping rod that is fixed to the piston. A pressurized gas fills the cylinder. A restrictive passage in the piston allows gas to move from one side of the piston to the other as the piston moves within the cylinder. The pressurized gas within the cylinder biases the telescoping rod toward its maximum extension outward from the cylinder because the presence of the telescoping rod effectively reduces the area of the piston on which the pressurized gas can act on the side of the piston to which the telescoping rod is attached.

The second end 264 of the second arm 248 is attached to the display attachment bracket 256 by a two-axis pivot joint 266 that allows the pivotal movement of the display attachment bracket 256 about a vertical pivot axis and a horizontal pivot axis relative to the second end 264 of the second arm 248. The vertical pivot axis and the horizontal pivot axis are oriented relative to the display attachment bracket 256 such that they are both perpendicular to a direction vector V that is normal, i.e. perpendicular, to the surface of the display screen when the display 202 is attached to the display attachment bracket 256. A notch/recess 268 is provided near the second end 264 of the second arm 248 that receives a fin/detent 270 provided on the first end 224 of the first arm 226 when the second arm 248 is lowered to rest in superimposed fashion on top of the first arm 226. This feature prevents the second arm 248 from being moved pivotally in a horizontal plain from rest relative to the first arm 226 without the second arm 248 first being slightly raised to a predetermined height above the first arm 226. This feature prevents accidental movement of the display 202 when a mobile cart 204, to which the display support apparatus 200 is attached, is maneuvered.

The second arm 248 is defined by a four-link structure that includes a first knuckle 272, a first longitudinal link 274, a second longitudinal link 276, and a second knuckle 278. The first knuckle 272 defines the first end 258 of the second arm 248, and the second knuckle 278 defines the second end 264 of the second arm 248. The first knuckle 272 is pivotally attached to the first arm 226, the first longitudinal link 274 is pivotally attached to the first knuckle 272, the second longitudinal link 276 is pivotally attached to the first knuckle 272, and the second knuckle 278 is pivotally attached to both the first longitudinal link 274 and the second longitudinal link 276.

The second arm 248 is also provided with the gas strut 262 intermediate the first knuckle 272 and the second knuckle 278. The first end 280 of the gas strut 262 is adjustably supported by the first knuckle 272 and the second end 282 of the gas strut 262 is pivotally supported at a distance from the first knuckle 272. In the illustrated embodiment, the second end 282 of the gas strut 262 is pivotally supported by the second knuckle 278. The second arm 248 is attached to the display attachment bracket 256 by the two-axis pivot joint 266 that allows pivotal movement of the display attachment bracket 256 about both a vertical pivot axis and a horizontal pivot axis. An alternative would be to use a three-axis pivot joint that would additionally allow the display 202 and the display attachment bracket 256 to be rotated about an axis defined by the direction vector that is normal, i.e. perpendicular, to the surface of the display screen when the display 202 is attached to the display attachment bracket 256.

The longitudinal axis of the second arm 248 extends between the mid point of the center-to-center distance between the pivotal attachments of the longitudinal links 274, 276 with the first knuckle 272 and the mid point of the center-to-center distance between the pivotal attachments of the longitudinal links 274, 276 with the second knuckle 278. As the second end 264 of the second arm 248 is pivotally moved up and down, the longitudinal axis of the second arm 248 pivotally moves up and down about a horizontal axis and in a vertical plane, while the four-link arrangement maintains the vertical orientation of the second knuckle 278 even as the second end 264 of the second arm 248 is pivotally moved up and down. This arrangement therefore has the corresponding effect of also maintaining the orientation relative to the base 206 of the display attachment bracket 256 even as the second end 264 of the second arm 248 is raised or lowered vertically. Accordingly, the four-link structure of the second arm 248 constitutes a mechanism for providing a constant orientation relative to the base 206 for the display attachment bracket 256 even as the display 202 is raised or lowered vertically due to rotational motion of the longitudinal axis of the second arm 248 about a horizontal axis and in a vertical plane.

The supporting apparatus 200 further includes a first cable tray assembly 284 that is attached to the first arm 226. The supporting apparatus 200 is supplied with the first arm 226, the second arm 248, and the two-axis joint 266 assembled together. The first arm cable tray assembly 284, the first cable duct 286, and the second arm cable tray 288 are supplied loose for fitting during installation. Items such as Mounting Screws (Not shown) and Mounting Washers (Not Shown) are supplied by the customer. The various cable trays and ducts keep the data/video and/or power cables communicating with the display 202 well organized so that the cables will not interfere with the movements of the display support apparatus 200 and the cables will not be damaged or pinched during use of the display support apparatus 200.

The first pivot shaft 220 is screwed into the first end 224 of the first arm 226 using the screw threads 290 provided at one end of the first pivot shaft 220. The first pivot shaft 220 is in a rotating fit with the cylindrical projection 210 of the base 206. The second pivot shaft 292 is in a rotating fit with the second end 260 of the first arm 226. A drive arrangement consisting of the toothed belt 254, the first pulley 250, and the second pulley 252 runs between the first pivot shaft 220 and the second pivot shaft 292. The first pulley 250 is in a rotating fit on the first pivot shaft 220. The second pulley 252 is prevented from rotating about the second pivot shaft 292 by the engagement of two flat surfaces 294, 296 of the second pivot shaft 292 with the center hole 298 of the second pulley 252. The non-circular cross section of the hole 298, which has flat surfaces 218 and 222, matches the non-circular cross section of the portion of the second pivot shaft 292 having the flat surfaces 294, 296 such that there can be no relative rotation between the second pivot shaft 292 and the second pulley 252. Two belt anti-slip washers 300, 302 prevent the toothed belt 254 from skipping or jumping, and are keyed into the first arm 226 to prevent rotation of the belt anti-slip washers 300, 302 relative to the first arm 226. The belt 254 is also prevented from drifting along either the first Pulley 250 or the second Pulley 252, in the direction of the longitudinal axis of the respective pivot shaft 220 or 292, by respective polymer thrust bearings 304 and 306. A base polymer bearing 308 is pressed into the first end 224 of the first arm 226 to provide a rotational bearing between the cylindrical projection 210 of the base 206 and the first end 224 of the first arm 226. The rotation of the first pulley 250 relative to the base 206 is limited by peg 230 which engages with the arc-shaped groove 232 in the first pulley 250.

The torque required to rotate the first arm 226 relative to the base 206 and about the longitudinal axis of the first pivot shaft 220 is controlled by the press fitting of a variable number of friction elements 310 onto the first pivot shaft 220. The friction elements 310 are housed in the cylindrical sleeve 214 and are keyed to the base 206 such that there can be no relative rotation between the friction elements 310 and the base 206. The friction elements 310 frictionally grip the first pivot shaft 220 and exert a braking friction on the first pivot shaft 220 to prevent accidental or unintended rotational movement of the first arm 226 relative to the base 206. A washer 312 prevents debris entering into the area around the friction elements 310, and two Belleville washers 314 and 316 are used to eliminate any axial play along the first pivot shaft 220. These are secured in place with a washer 318 and the hex head screw 320, which is screwed into the end of the first pivot shaft 220 distal from the first end 224 of the first arm 226 and held in place with a thread locking adhesive.

The second pivot shaft 292 passes through the second end 260 of the first arm 226 and is capable of rotation relative to the first arm 226. Again a number of friction elements 322 are provided intermediate flat surfaces 294, 296 of the second pivot shaft 292 and the first end 258 of the second arm 248. The torque required to rotate the second arm 248 relative to the first arm 226 and about the longitudinal axis of the second pivot shaft 292 is controlled by the press fitting of a variable number of the friction elements 322 onto the second pivot shaft 292. The friction elements 322 are housed in a cavity 324 in the second end 260 of the first arm 226 and are keyed to the first arm 226 such that there can be no relative rotation between the friction elements 322 and the first arm 226. The friction elements 322 frictionally grip the second pivot shaft 292 and exert a braking friction on the second pivot shaft 292 to prevent accidental or unintended rotational movement of the second arm 248 relative to the first arm 226. A washer 326 prevents debris entering into the area around the friction elements 322, and two Belleville washers 328 and 330 are used to eliminate any axial play along the second pivot shaft 292. These are secured in place with a washer 332 and the hex head screw 334, which is screwed into the end of the second pivot shaft 292 that is distal from the first end 258 of the second arm 248. The screw 334 is held in place with a thread locking adhesive. The second pivot shaft 292 is provided with additional flat surfaces 293 and 295 that engage mating flat surfaces 257 and 259 in the first end 258 of the second arm 248 in order to help prevent relative rotation between the second pivot shaft 292 and the second arm 248. The second pivot shaft 292 is fixedly secured to the second arm 248 with a cap head screw 382, which is screwed into the second pivot shaft 292.

Two quarter turn receptacles 336 and 338 are pressed into the first Arm 226, which provides a means of quickly attaching the first arm cable tray assembly 284 during final installation.

The second arm 248 consists of a four-linkage arrangement formed from the first knuckle 272, the first longitudinal link 274, the second longitudinal link 276, and the second knuckle 278. The pivoting joints are provided by four cross pins 340, 342, 344, and 346. The cross pin 340 rotationally fits through the first Knuckle 272 and one end of the first longitudinal link 274 to pivotally attach the first longitudinal link 274 to the first Knuckle 272. The pair of polymer bearings 348 prevent any play in the pivotal attachment between the first longitudinal link 274 and the first Knuckle 272 while providing for smooth rotational movement in the joint. Also, the pair of polymer bearings 348 provide some braking friction to help prevent any unintended up or down movement of the second arm 248. The cross pin 342 rotationally fits through the first Knuckle 272 and one end of the second longitudinal link 276 to pivotally attach the second longitudinal link 276 to the first Knuckle 272. The pair of polymer bearings 350 prevent any play in the pivotal attachment between the second longitudinal link 276 and the first Knuckle 272 while providing for smooth rotational movement in the joint. Also, the pair of polymer bearings 350 provide some braking friction to help prevent any unintended up or down movement of the second arm 248. The cross pin 344 rotationally fits through the second Knuckle 278 and the other end of the first longitudinal link 274 to pivotally attach the first longitudinal link 274 to the second Knuckle 278. The pair of polymer bearings 352 prevent any play in the pivotal attachment between the first longitudinal link 274 and the second Knuckle 278 while providing for smooth rotational movement in the joint. Also, the pair of polymer bearings 352 provide some braking friction to help prevent any unintended up or down movement of the second arm 248. The cross pin 346 rotationally fits through the second Knuckle 278 and the other end of the second longitudinal link 276 to pivotally attach the second longitudinal link 276 to the second Knuckle 278. The pair of polymer bearings 354 prevent any play in the pivotal attachment between the second longitudinal link 276 and the second Knuckle 278 while providing for smooth rotational movement in the joint. Also, the pair of polymer bearings 354 provide some braking friction to help prevent any unintended up or down movement of the second arm 248.

The cross pins 340, 342, 344, and 346 are retained in the assembly by a head at one end, whilst the other end of each is flared during assembly. The ends of the cross pins 340, 342, 344, and 346 are covered by pivot covers 356, 358, 360, and 362, which are snapped into place. Inside the second arm 248 is an arrangement to provide vertical thrust for the second end of the second arm 248 to counterbalance the weight of the display 202. One end 282 of the gas strut 262 is rotationally supported by the cross pin 344 to pivotally attach the end 282 of the gas strut 262 to the second knuckle 278. The other end 280 of the gas strut 262 is rotationally supported by the stepped pin 364, which is in turn rotationally supported by the yoke 366 of the adjustment bridge 368. The adjustment screw 370, which is axially constrained in the first knuckle 272 by a washer 372 and E-clip style retaining ring 374, is in threaded engagement with a threaded hole in the adjustment bridge 368 such that rotation of the screw 370 causes rectilinear movement of the adjustment bridge 368 in the vertical direction. This arrangement provides for linear adjustment in the position of the adjustment bridge 368 by rotating the adjustment screw 370, which enables the vertical thrust provided by the second arm 248 to counterbalance the weight of the display 202 to be varied as necessary to accommodate displays of various weights.

A variable number of friction elements 376 are housed in the second knuckle 278 to provide a frictional braking force between the second knuckle 278 and the vertical pivot shaft 378 of the two-axis joint 266, again to prevent unintended movement of the display attachment bracket 256 and in turn of the display 202. A polymer bearing 380 is also pressed into the first knuckle 272 to provide a rotational bearing for the rotational attachment between the first arm 226 and the second arm 248. The second arm 248 is secured to the first arm 226 with the cap head screw 382, which is screwed into the second pivot shaft 292.

The two-axis joint 266 comprises a tilt shaft housing 384, superimposed lateral arms 386 and 388, and a tilt shaft 390. The tilt shaft housing 384 and the superimposed lateral arms 386 and 388 together form the two-axis joint housing 402. The tilt shaft 390 extends through the tilt shaft housing 384. A variable number of friction elements 392 are provided in the tilt shaft housing in order to impart a braking friction to the tilt shaft 390, again to prevent unintended movement. Two bushings 394 act as bearings for the tilt shaft 390, whilst two adaptors 396 are pressed onto either end of the tilt shaft 390, retaining it in place. The two adaptors 396 and the tilt shaft 390 rotate together as a unit. The display attachment bracket 256 is attached to the adaptors 396 with four screws 398, and two bumpers 400 are pressed into the display attachment bracket 256 to provide a soft stop between the two-axis joint housing 402 and the display attachment bracket 256 at the extremes of the rotation of the display attachment bracket 256 about the longitudinal axis of the tilt shaft 390. A counterbalancing spring 404 is housed within the tilt shaft housing 384, which has one end keyed to the tilt shaft housing 384, and the other end keyed to one of the adaptors 396. This provides a counterbalancing force for the weight of the display 202 to reduce the effort required to tilt the display about the longitudinal axis of the tilt shaft 390, corresponding to rotation about the horizontal axis, and to prevent unintended movement due to gravity. The two-axis joint housing 402 is attached to the second knuckle 278 by the vertical pivot shaft 378, which passes through one of the lateral arms 386, the previously mentioned friction elements 376, and is press fit into the lateral arm 388. Two rotation limiting washers 406, which are keyed to the two-axis joint housing 402 via the lateral arms 386 and 388, provide bearing surfaces between the second knuckle 278 and the two-axis joint housing 402. The rotation limiting washers 406 have pegs 408 that engage arc-shaped grooves 410 in the second knuckle 278 to act as rotational stops for the extremes of the swivel, i.e. rotation about the longitudinal axis of the vertical pivot shaft 378.

The first cable tray assembly 284 consists of a cable tray 412, with two quarter turn studs 414, and two quarter turn retaining washers 416. Each stud 414 is retained in the assembly by a respective quarter turn retaining washer 416. During installation by the end user, the quarter turn studs are secured to respective quarter turn receptacles 336, 338 in the first arm 226, thus providing a quick 'quarter turn' installation.

The friction elements 310, 322, and 376 are of the type that is fixed against rotation in the middle, while friction elements 392 are of the type that is fixed against rotation at one end. The friction elements 392 are preferably oriented such that they provided greater friction torque when the display 202 and/or the display attachment bracket 256 are being tilted downward as compared to when they are being tilted upward to compensate for the force of gravity. Although in the illustrated example the second pulley was fixed to the second arm 248 while the first pulley was free to rotate over a predetermined range, it is possible to reverse the arrangement and fix the first pulley to the base 206 while allowing the second pulley to rotate freely.

As previously stated, the arc-shaped depression 238 limits the range of rotation of the first arm 226 relative to the base 206. A bisector plane can also be imagined for first arm 226. This would be a vertical plane containing the first pivot axis and passing through the mid point of the arc-shaped depression 238. The first arm 226 would be limited to rotational movement of ±90° relative to this plane. The belt and pulley system described previously ensures that the second arm cannot rotate beyond the back plane of the cart 204, which is a vertical plane that is perpendicular to the bisector plane of the first arm and which contains the first pivot axis defined by the longitudinal axis of the first pivot shaft, when the first arm is at the limits of its rotational motion relative to the bisector plane of the first arm. In fact, the belt-and-pulley system ensures that the bisector plane of the second arm has a normal vector that has the same direction as the normal vector of the bisector plane of the first arm at all times regardless of the rotational position of the first arm. To see how this is accomplished, consider the display support apparatus 200 as shown in FIG. 2. In this position, the peg 230 is position in the middle of the slot 232 of the first pulley 250. Starting from this position, imagine that the second arm 248 is rotated to the right of an observer facing the display while the first arm remains stationary. During this motion of the second arm 248 the second pulley 252 is rotated, which in turn causes the rotation of the first pulley 250 until the peg 230 engages the end wall 234 of groove 232 in the first pulley 250. At this point the second arm 248 is at 90° with respect to the first arm 226 and the second arm cannot move further to the right without moving the first arm 226. If the first arm 226 is now rotated to the right, the first pulley 250 cannot rotate because of the interaction of the peg 230 and the end wall 234 of groove 232 in the first pulley 250. Accordingly, the second pulley 252 and consequently the second arm 248 are prevented from rotating relative to the bisector plane of the second arm 248 due to the action of the belt 254. Therefore, the second arm will remain at 90° relative to the bisector plane of the second arm even as the first arm 226 is rotated to the right, and the angle between the first arm 226 and the second arm 248 will continue to increase from 90° until it reaches an angle of 180° when the first arm reaches the limit of its rotation at 90° relative to the bisector plane of the first arm. A similar sequence of events will follow if the first and second arms are moved to the left from initial position of FIG. 2. Thus, the rotational movement of the second arm 248 is limited to ±90° relative to the bisector plane of the second arm, and the rotational movement of the first arm 226 is limited to ±90° relative to the bisector plane of the first arm. The course the first and second arms can assume a variety of angular positions between one another ranging from 0° to 180° as the arms are rotated between the extremes shown in FIGS. 1 and 3. The angular limits in the illustrated embodiment are provided as an example of a preferred embodiment and these limits can be varied by varying the length of the grooves 232 and 238 and/or the sizes of the pegs 230 and 242, respectively.

Gas struts are well known and are not described in detail, as are friction elements. It should be noted that the present invention is not limited to the disclosed embodiment, but that it includes all embodiments within the scope of the appended claims.

The invention claimed is:

1. A display support apparatus for supporting a display at a user selected position relative to a support structure, the display support apparatus comprising:

a base adapted for attachment to the support structure;

a first arm having a range of rotation about a first pivot axis between the first arm and the base, the first pivot axis extending through a first end portion of the first arm;

a second arm having a range of rotation about a second pivot axis between the first arm and the second arm, the second pivot axis being located at a proximal end portion of the second arm; and a recess and a detent, the recess being configured to receive the detent when the second arm is in a resting position relative to the first arm, wherein the recess is configured to limit movement of the second arm relative to the first arm about the second pivot axis when the second arm is in the resting position, and to permit movement of the second arm from the resting position, in which the detent is positioned within the recess, to an extended position in which the second arm is moved relative to the first arm about a transverse axis angled relative to the second pivot axis, wherein, in the extended position, the recess is separated from the detent.

2. The display support apparatus of claim 1, wherein the recess and the detent are configured to prevent the second arm from being moved pivotally in a plane from the resting position without the detent and the recess first being separated at least a predetermined distance relative to one another.

3. The display support apparatus of claim 1, wherein the detent extends outwardly relative to the first end portion of the first arm.

4. The display support apparatus of claim 1 further comprising a pivot joint attached to a distal end portion of the second arm.

5. The display support apparatus of claim 4, wherein the recess is defined by a surface associated with the pivot joint.

6. The display support apparatus of claim 5, wherein the pivot joint includes a tilt shaft extending through a tilt shaft housing and one or more lateral arms extending from the tilt shaft housing.

7. The display support apparatus of claim 6, wherein the pivot joint is a two-axis pivot joint that allows pivotal movement about a vertical pivot axis and a horizontal pivot axis relative to the distal end portion of the second arm.

8. The display support apparatus of claim 7, wherein the vertical pivot axis and the horizontal pivot axis are oriented relative to a display attachment bracket such that the vertical and horizontal pivot axes are both perpendicular to a direction vector that is normal to a surface of the display when the display is attached to the display attachment bracket.

9. The display support apparatus of claim 8, wherein the pivot joint further comprises two adaptors, each adaptor attached to a respective end of the tilt shaft such that the two adaptors and the tilt shaft rotate together as a unit.

10. The display support apparatus of claim 9 further comprising a display attachment bracket attached to the adaptors.

11. The display support apparatus of claim 9 further comprising a counterbalancing spring housed within the tilt shaft housing, the spring having one end keyed to the tilt shaft housing and another end keyed to one of the adaptors.

12. The display support apparatus of claim 11, wherein the counterbalancing spring is configured to provide a counterbalancing force for a weight of the display to reduce the force required to tilt the display about a longitudinal axis of the tilt shaft and to prevent unintended movement of the display due to gravity.

13. The display support apparatus of claim 8, wherein the pivot joint further comprises one or more friction elements provided in the tilt shaft housing in frictional engagement with the tilt shaft.

14. The display support apparatus of claim 13, wherein the one or more friction elements are fixed against rotation at one end.

15. The display support apparatus of claim 13, wherein the one or more friction elements are oriented such that the one or more friction elements provide greater friction torque when the display attachment bracket is tilted downwardly than when the display attachment bracket is tilted upwardly.

16. The display support apparatus of claim 7 further comprising a display attachment bracket attached to the pivot joint.

17. The display support apparatus of claim 16, wherein the recess and the detent are configured to prevent rotation of the display attachment bracket about the vertical pivot axis without the detent and the recess first being separated at least a predetermined distance with respect to one another.

18. The display support apparatus of claim 16, wherein the display attachment bracket includes at least one bumper to provide a softer stop between the pivot joint and the display attachment bracket during rotation of the display attachment bracket about the horizontal pivot axis.

19. The display support apparatus of claim 6, wherein the pivot joint is attached to the distal end portion of the second arm by a vertical pivot shaft that passes through the one or more lateral arms.

20. The display support apparatus of claim 19 further comprising one or more rotation limiting washers configured to provide bearing surfaces between the second arm and the pivot joint.

21. The display support apparatus of claim 20, wherein the one or more rotation limiting washers include pegs engaging arc-shaped grooves to act as a rotational stop during rotation about the vertical pivot shaft.

22. The display support apparatus of claim 1, wherein the second arm comprises a first longitudinal link pivotally attached to a first knuckle at the proximal end portion and a second knuckle at a distal end portion, a second longitudinal link pivotally attached to the first knuckle at the proximal end portion and the second knuckle at the distal end portion, and a gas strut positioned between the first and second longitudinal links, and the second arm is connected to the first arm via the first knuckle.

23. The display support apparatus of claim 22 further comprising an adjustment screw axially constrained in the first knuckle and coupled to the gas strut by an adjustment bridge, wherein rotation of the adjustment screw causes movement of the adjustment bridge along the adjustment screw and enables vertical thrust provided by the arm to be varied and accommodate objects of various weights attached to the distal end of the second arm.

24. The display support apparatus of claim 1 further comprising rotation stops that limit the range of rotation of the first arm relative to the base about the first pivot axis.

25. The display support apparatus of claim 1, wherein the recess is a notch.

26. The display support apparatus of claim 1, wherein the detent is a fin.

27. A display support apparatus for supporting a display at a user selected position relative to a support structure, the display support apparatus comprising:

a base adapted for attachment to the support structure;

an arm having a range of rotation about a pivot axis between the arm and the base, the pivot axis extending through an end portion of the arm; and a recess and a detent, the recess being configured to receive the detent when the arm is in a resting position relative to the base, wherein the recess is configured to limit movement of the arm relative to the base about the pivot axis when the arm is in the resting position in which the detent is positioned within the recess and to permit movement of the arm relative to the base about a transverse axis angled relative to the pivot axis when the arm is moved from the resting position to an extended position in which the detent is separated from the recess.

28. The display support apparatus of claim 27, wherein the recess is a notch.

29. The display support apparatus of claim 27, wherein the detent is a fin.

* * * * *